United States Patent [19]
Elliott et al.

[11] 4,106,099
[45] Aug. 8, 1978

[54] REFINERY AND PIPELINE MONITORING SYSTEM

[76] Inventors: Peter F. Elliott; Kenneth D. Elliott, both of P.O. Box 31227, Cincinnati, Ohio 45231

[21] Appl. No.: 814,132

[22] Filed: Jul. 8, 1977

Related U.S. Application Data

[63] Continuation-in-part of Ser. No. 704,538, Jul. 12, 1976.

[51] Int. Cl.² .................... G01M 3/28; G01F 1/00; G06F 15/46
[52] U.S. Cl. ........................... 364/510; 73/40.5 R; 235/92 PD; 235/92 FL; 364/500
[58] Field of Search ............... 364/510, 496, 500; 235/92 FL, 92 PD; 73/40.5 R, 40, 196

[56] References Cited

U.S. PATENT DOCUMENTS

| | | | |
|---|---|---|---|
| 3,505,513 | 5/1968 | Fowler et al. | 235/151.34 |
| 3,690,150 | 9/1972 | Mullen | 73/40.5 R |
| 3,723,987 | 3/1973 | Barone, Jr. et al. | 73/196 X |
| 3,909,596 | 9/1975 | Sullivan | 235/151.34 X |
| 3,952,759 | 4/1976 | Ottenstein | 235/151.34 X |
| 3,987,662 | 10/1976 | Hara et al. | 235/151.34 X |

*Primary Examiner*—Edward J. Wise
*Attorney, Agent, or Firm*—Wood, Herron & Evans

[57] ABSTRACT

A monitor is disclosed which indicates a series of short-term losses of fluid between any two stations along a fluid flow system such as a refinery or pipeline. The series of short-term losses relates to a chain of intervals of operation of the fluid flow system. A sudden disturbance in the operation of the fluid flow system during an interval of operation is smoothed over a selectively variable number of short-term loss indications in the series rather than being reflected entirely in the short-term loss indication for the interval of operation in which the sudden disturbance occurs. On the other hand, actual changes in the operation of the fluid flow system are averaged over the selectively variable number of short-term loss indications in the series so that rapid changes as well as gradual changes in the operation of the fluid flow system result in a trend in the series of short-term loss indications. This permits personnel to reliably monitor the fluid flow system and, therefore, facilitates adjustment of the operation or repair of the fluid flow system only when it is actually needed. The monitor also provides an overall loss indication based on the total amount of fluid input to and output from the fluid flow system for a period in the operation of the fluid flow system the minimum duration of which is longer than a predetermined time delay. The monitor can determine the end of the overall loss indication period by detecting when the status of operation of the fluid flow system returns to the status which existed at the start of the predetermined time delay.

6 Claims, 13 Drawing Figures

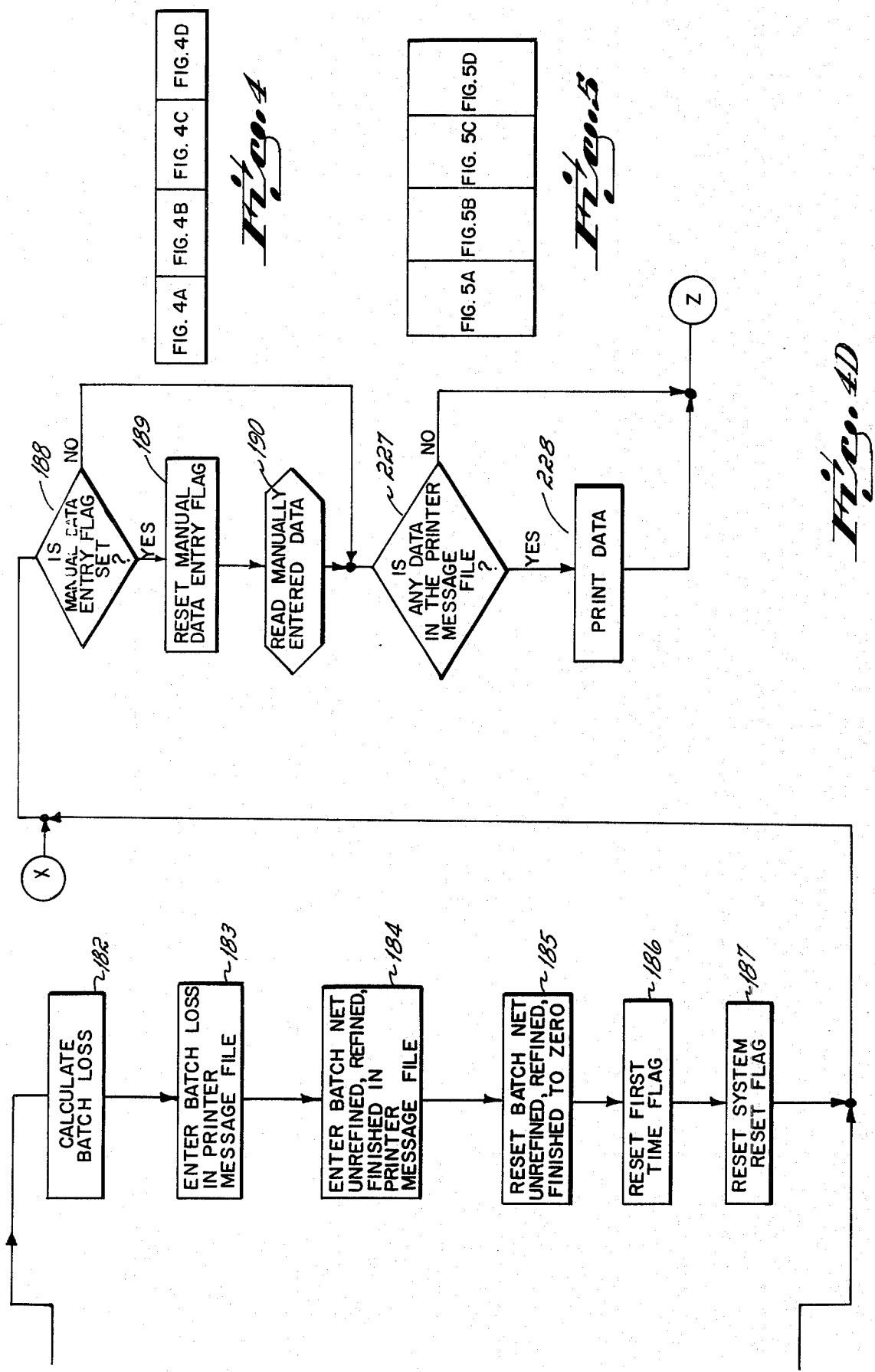

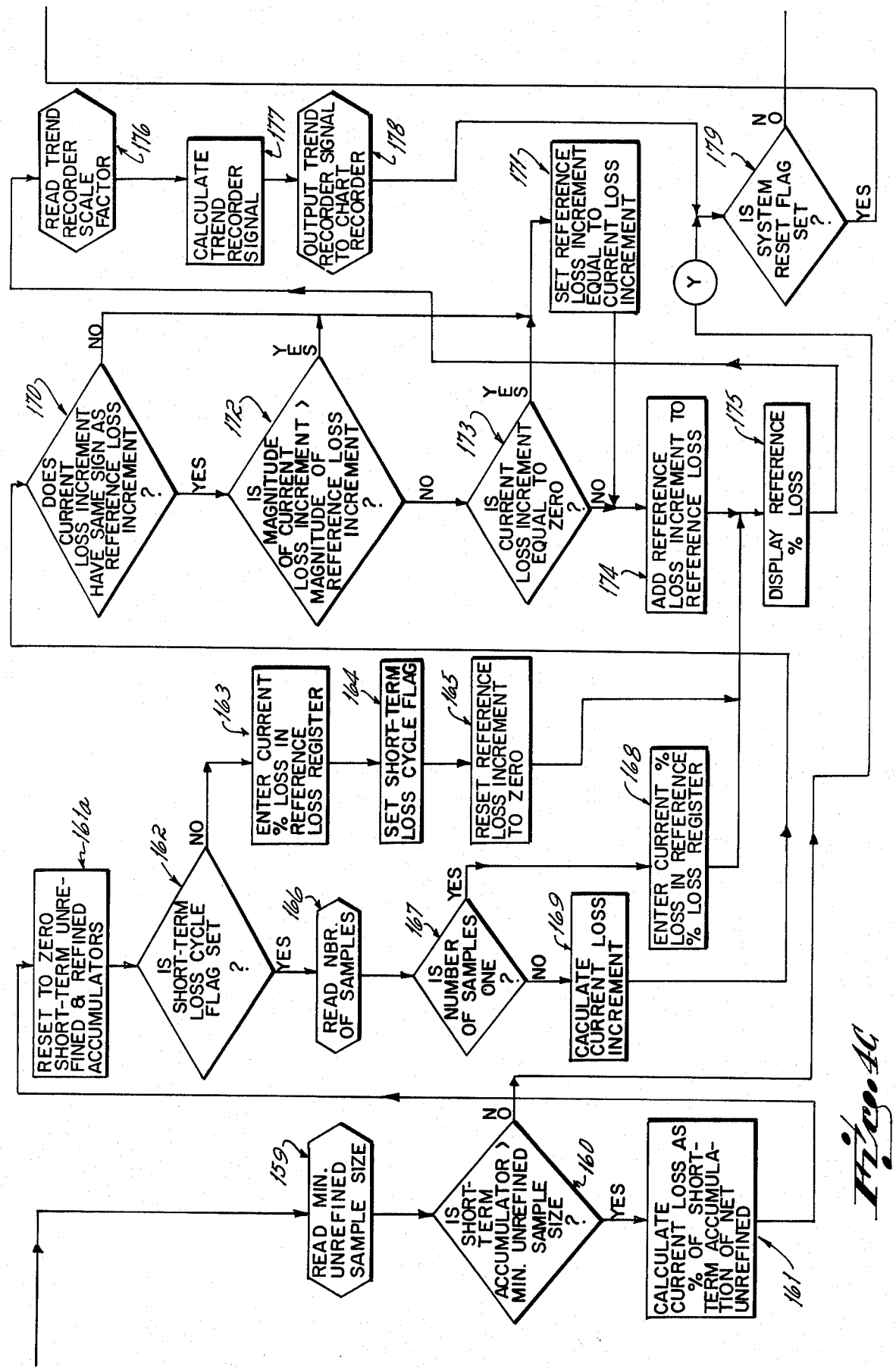

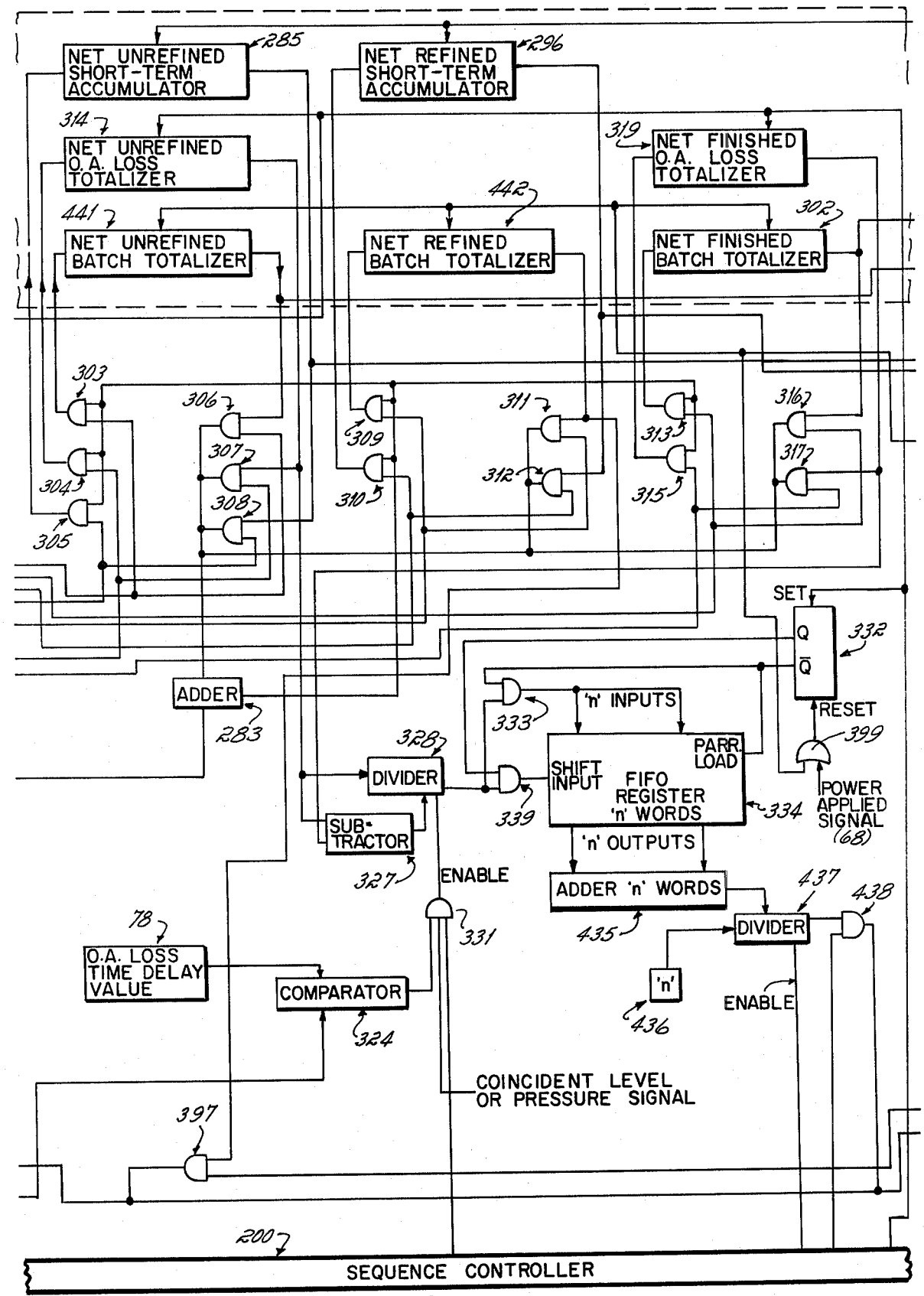

4,106,099

REFINERY AND PIPELINE MONITORING SYSTEM

CROSS-REFERENCE TO RELATED APPLICATION

This application is a continuation-in-part of the pending original application of Peter F. and Kenneth D. Elliott for REFINERY AND PIPELINE MONITORING SYSTEM, U.S. Ser. No. 704,538, which was filed July 12, 1976, allowed.

BACKGROUND OF THE INVENTION

The present invention relates to apparatus and methods which provide data by which personnel can monitor the operation of a fluid flow system.

Leakage of fluid from a fluid flow system for toxic, corrosive, or flammable chemicals poses a potential safety hazard for employees of an industrial plant and inhabitants of the surrounding community. Leakage from a fluid flow system, such as a pipeline for transportation of crude oil from offshore to onshore stations, poses a risk of damage to the environment. Leakage during transportation of fuel in a pipeline results in diminution of the available supply of fuel and adds to the energy crisis. In the interests of safety, ecology, and energy conservation, operation of fluid flow systems must be monitored so that prompt corrective action can be taken in the event of loss due to leakage.

Unnecessary refining loss is a major concern of industry. Production control personnel must know the refining loss in order to adjust operation of the refining process to improve efficiency and to reduce refining loss to an optimum figure. In the interest of efficiency, refining processes must be monitored so that prompt corrective action can be taken to minimize loss due to refining.

Moreover, if loss due to leakage or refining is minimized, waste of significant dollar amounts of material is avoided.

In all fluid flow systems operation can be monitored by comparing the amount of fluid that is input to the fluid flow system with the amount of fluid that is output from the fluid flow system. If more fluid flows in than out, the occurrence of a loss is indicated. If more fluid flows out than in, the occurrence of a gain is indicated. Actually, "gain" is negative loss and is hereinafter included within the meaning of the term "loss" unless it is expressly stated otherwise.

For many years leakage detection systems employed instantaneous flow measurements at spaced stations along a pipeline and determined the difference between these instantaneous measurements to obtain an indication of loss between any two locations monitored. By instantaneous measurement is meant a measurement of a characteristic of the fluid flow system, such as fluid flow, at a particular moment in time. Such leakage detection systems assumed a hydraulic stability that cannot and does not occur in practice. Consequently, sudden disturbances in the operation of the fluid flow system resulted in erroneous loss indications.

In an attempt to improve upon such leakage detection systems, the monitoring system of Fowler et al, U.S. Pat. No. 3,505,513, totals the fluid that flows through remote stations at various locations along a pipeline over an interval of time. Upon interrogation from a master station at the end of the time interval each remote station transmits its total to the master station. The master station calculates the difference between totals at successive stations. The calculation is compared to a preset limit to obtain an indication of loss due to leakage.

The system of Fowler et al indicates a short-term loss for the pipeline since the calculation is based on totals for an interval of operation rather than instantaneous measurements. Fowler et al recognizes the fact that noise or sudden disturbances, such as sharp pressure or temperature changes, which occur during an interval of operation, can cause a spurious loss indication, especially where the monitoring system is set to detect a small leak. Fowler et al proposes that a counter be employed so that the monitoring system responds only to a predetermined number of consecutive short-term loss calculations.

Erroneous loss indications can, however, result unless the minimum number of consecutive short-term loss calculations cannot occur during a period of time less than the stabilization time for the pipeline. If the stabilization time is taken into account, however, a large amount of fluid can be lost before personnel take corrective action since no alarm due to an actual change in the operation of the pipeline results for a predetermined number of consecutive intervals of operation of the pipeline.

The monitoring system of Sullivan, U.S. Pat. No. 3,909,596, employs stations at various locations in a refinery which generate counts which are temperature compensated and which may be moisture compensated based on laboratory analysis. After one of the stations reaches a predetermined count, it enables a difference counter. The difference counter counts simultaneously with the second station until the second station reaches the predetermined number of counts. The difference count is displayed as an indication of loss due to refining.

The monitoring system of Sullivan indicates a short-term loss for a refining process, analogous to the short-term loss for a pipeline by Fowler et al, since each difference count relates to an interval of operation. Sullivan recognizes the fact that noise or sudden disturbances, such as sharp pressure changes, may cause a spurious loss indication. Sullivan proposes that the counters at the stations count predetermined ones of the signals generated by the stations to increase the period of time which is required to arrive at the difference count beyond the stabilization time of the refining process.

Since sudden disturbances during an interval of operation influence the loss for only that interval of operation, however, the indication of loss for the interval of operation can appear unreasonably high. Although the fluid flow system might actually have stabilized, personnel may react unnecessarily to the high loss indication to adjust operation of the refining process since in the event operation has not stabilized hesitation would result in waste of material.

It is an object of the present invention to provide apparatus and methods which indicate a series of short-term losses in which each element of the series is determined on the basis of data for more than a single interval of operation, thereby eliminating spurious indications of loss due to sudden disturbances in the operation of the fluid flow system.

It is an associated object of the present invention to smooth sudden disturbances in the operation of the fluid flow system over a selectively variable number of short-term loss indications in the series.

It is also an associated object of the present invention to provide apparatus and methods to average changes in the operation of the fluid flow system over a selectively variable number of short-term loss indications in the series for the purpose of displaying trends in the operation of the fluid flow system.

It is another object of the present invention to provide apparatus and methods which, in addition to indicating a series of short-term losses, indicate an accurate overall loss for a period of operation of the fluid flow system.

It is an additional object of the present invention to provide apparatus and methods to correct fluid flow meter measurements to a standard temperature, moisture content, and flow meter calibration to assure the reliability of both the short-term and overall loss indications.

SUMMARY OF THE INVENTION

The above and other objects are attained in accordance with the present invention which provides an improved monitor that computes a series of short-term loss indications based on (a) the accumulated net amount of fluid which has flowed through one station along a fluid flow system during an interval of operation, (b) the accumulated net amount of fluid which has flowed through another station along the fluid flow system during the same interval of operation, and (c) a selectively variable number which is used as a smoothing or averaging factor. The accumulated net amount of fluid which flows through each station during an interval of operation of the fluid flow system comprises a measurement during the interval of operation by a flow meter at the station which the monitor then corrects to standard temperature, moisture content, and for station flow meter calibration. Since the accuracy of a short-term loss indication is dependent upon the accuracy of the flow meter measurement, each interval of operation for which a short-term loss indication is computed requires that the accumulated net amount of fluid which has flowed through a preselected station along the fluid flow system must exceed a predetermined minimum amount to provide a desired resolution in the computations consistent with the predicted repeatability of the flow meter measurements. This assures accuracy of the data which is used in the computations. The smoothing or averaging factor is selected by personnel monitoring the fluid flow system. This number, for example, forty, defines a series which comprises a number of short-term loss indications over which (a) any sudden disturbances in the operation of the fluid flow system are smoothed in order to eliminate a spurious loss indication for any interval of operation and (b) any changes in the operation of the fluid flow system are averaged in order to display a trend for more reliable monitoring of the fluid flow system. As desired, of course, the selected smoothing or averaging factor may be set to one. Nevertheless, some smoothing of sudden disturbances will occur, because the short-term loss computation is performed on a predetermined minimum amount of fluid so as to provide a desired resolution in the computations consistent with the predicted repeatability of the flow meter measurements as indicated above.

The optimum value for the predetermined minimum amount of fluid which must be exceeded before each short-term loss indication is computed can be determined experimentally during the installation and start-up phase of the monitor of the present invention, or, alternatively, the predetermined minimum amount of fluid can be predicted on the basis of the practical and physical limitations of the flow meters. One limitation which may define the predetermined minimum amount of fluid is the resolution of the output (measurement) signal transmitted from each flow meter to the monitor of the present invention. If this signal is in the form of electrical pulses where each pulse represents an amount of fluid, then in order to detect differences between the measurements at any two stations with a one part in ten thousand accuracy at least ten thousand pulses must be accumulated for one station before computing the difference between the measurement for the one station and the measurement for the other station of interest.

Since the series of short-term loss indications of the fluid flow system is correlated to a selectable smoothing or averaging factor, the monitor of the present invention has the distinct advantage of de-emphasizing sudden disturbances during any interval of operation of the fluid flow system being monitored. Moreover, changes in the operation of the fluid flow system being monitored appear as a trend. Furthermore, the monitor of the present invention has the significant advantage of requiring a minimum of memory to determine a series of short-term loss indications.

The monitor of the present invention also provides computation of an overall loss using the total net amount of fluid input to and output from a fluid flow system during a period of its operation. The overall loss is determined by computing the difference between the total net amount of fluid input to and the total net amount of fluid output from the fluid flow system. The difference may be divided by the total net amount of fluid input to the fluid flow system, thereby indicating an overall loss as a percentage of the total net amount of fluid input to the fluid flow system.

The overall loss represents the loss between input and output stations rather than the loss between any two stations which is represented by the series of short-term loss indications. The overall loss relates to a period of operation of the fluid flow system generally longer than the sum of the intervals of operation to which the series of short-term loss indications relates. The overall loss enables the operators of the refinery or pipeline to analyze medium-term operation of the fluid flow system whereas the series of short-term loss indications is intended to enable personnel to supervise short-te ₁ operation of the fluid flow system and repair or adjust operation of the fluid flow system if it is necessary. The overall loss computation can be triggered by a fluid level or pressure transducer located at a point along the fluid flow system which detects a return to a status of operation of the fluid flow system after a predetermined time delay to the status which existed at the start of the predetermined time delay. This assures accuracy of the overall loss computation. The time delay is incorporated to provide a minimum time interval between any two overall loss computations.

Other objects and advantages of the monitor of the present invention will become clear from a consideration of the drawing in connection with the general and detailed descriptions which follow.

GENERAL DESCRIPTION OF SYSTEM AND OPERATION

Figure 1:
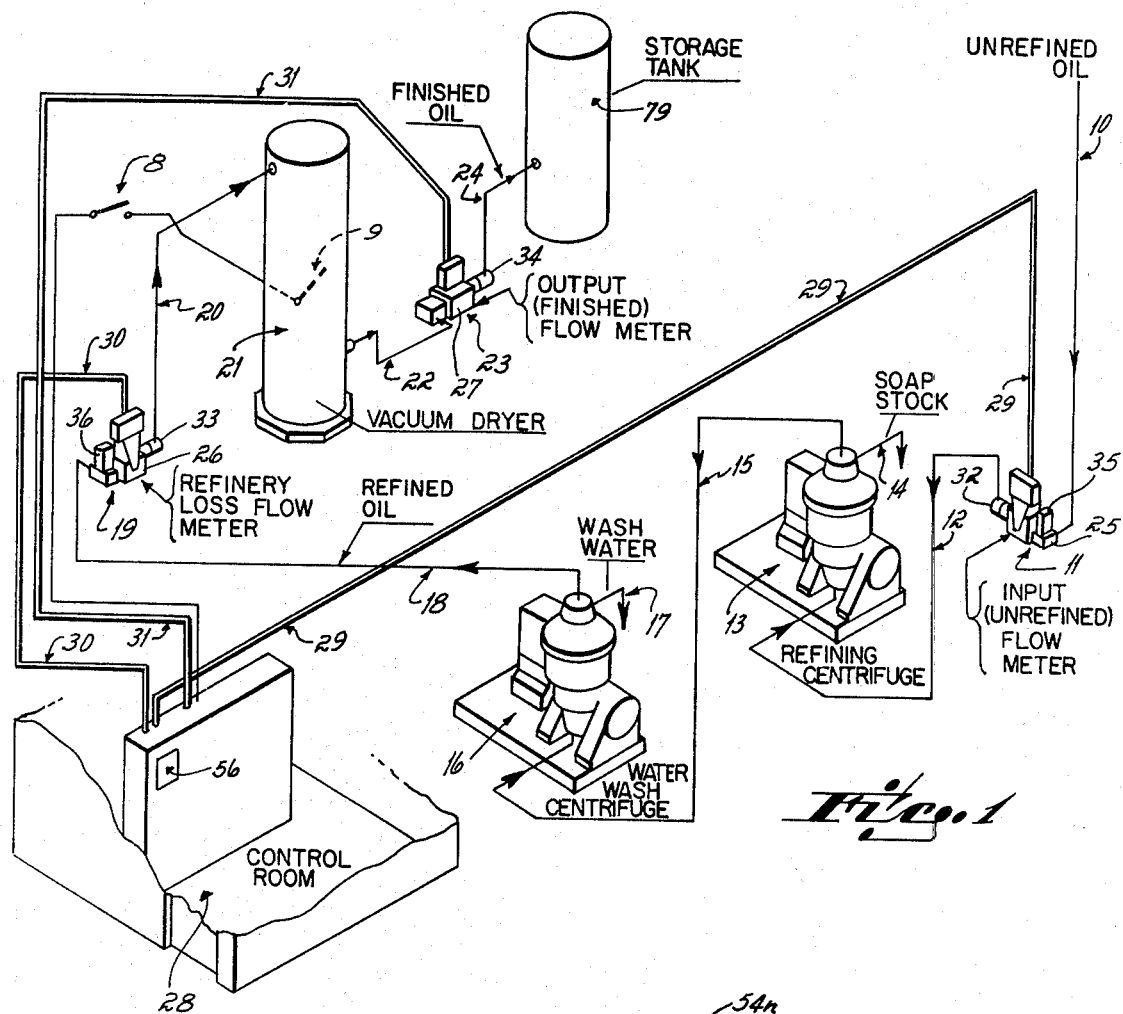
FIG. 1 is a diagrammatic representation of a vegetable oil refinery employing a monitor incorporating the features of the present invention.

The monitor of the present invention will be described in connection with a representative refining process such as the vegetable oil refinery depicted in the diagrammatic representation of FIG. 1. As shown in FIG. 1, unrefined vegetable oil from a storage tank (not shown) is input to pipe 10 and is fed according to the present invention through input flow meter 11, which measures the unrefined oil input to the vegetable oil refinery. Pipe 12 connects input flow meter 11 (usually via a heater, not shown) to refining centrifuge 13 in which the unrefined oil is subjected to lye and from which soap stock is withdrawn through pipe 14. The treated oil flows from refining centrifuge 13 through pipe 15 (usually via another heater, not shown) to water wash centrifuge 16 in which heated water is used to wash out remaining lye and from which wash water is withdrawn through pipe 17. Refined oil flows from water wash centrifuge 16 through pipe 18 and is fed according to the present invention through refinery loss flow meter 19, which measures the output of oil from the refining process. Pipe 20 connects refinery loss flow meter 19 to vacuum dryer 21 which removes excess water from the refined oil. Finished oil flows from vacuum dryer 21 through pipe 22 and is fed according to the present invention through output flow meter 23, which measures the output of finished oil from the vegetable oil refinery before it enters storage tank 79 via pipe 24.

Input flow meter 11, refinery loss flow meter 19, and output flow meter 23 may each comprise a positive displacement flow meter which has at least one rotor. The rotors of input flow meter 11, refinery loss flow meter 19 and output flow meter 23 are connected to high frequency pulse generators 25, 26 and 27, respectively.

Pulse generators 25, 26 and 27 may each comprise a high frequency pulse generator disclosed in Rockwell Manufacturing Company Technical Data: S 351-10C. The rotor of each flow meter 11, 19 or 23 rotates directly or indirectly a shaft of the pulse generator 25, 26 or 27 associated therewith. Each shaft rotates a disc with precisely spaced opaque and transparent slots between an incandescent lamp and a photo-voltaic cell. The rapid interruption of the light source causes the photocell to emit pulses into a self-contained transistorized circuit for shaping and amplifying. Each resulting pulse from pulse generator 25, 26 or 27 is a positive square wave. The number of pulses generated by pulse generators 25, 26 and 27 depends upon the amount of oil which flows through flow meters 11, 19 and 23, respectively. The outputs of pulse generators 25, 26 and 27 are connected to control room 28 via multiple conductor cables 29, 30 and 31, respectively.

Temperature transducers 32, 33 and 34, such as thermocouples, measure the temperature of fluid which flows through flow meters 11, 19 and 23, respectively. Thus, the temperature of unrefined oil flowing through input flow meter 11 is measured by temperature transducer 32, the temperature of refined oil flowing through refinery loss flow meter 19 is measured by temperature transducer 33, and the temperature of finished oil flowing through output flow meter 23 is measured by temperature transducer 34. The outputs of temperature transducers 32, 33 and 34 are connected to control room 28 via multiple conductor cables 29, 30 and 31, respectively.

The monitor of the present invention preferably employs moisture content transducers 35 and 36 at the input flow meter 11 and refinery loss flow meter 19 locations, respectively. Moisture content transducers 35 and 36 may each comprise apparatus such as Ennis et al., U.S. Pat. No. 2,617,299, disclosed for determining the moisture content of oil based on the dielectric constant of fluid. The outputs of moisture content transducers 35 and 36 are connected to control room 28 via multiple conductor cables 29 and 30, respectively.

The outputs from pulse generators 25, 26 and 27, the analog outputs of temperature transducers 32, 33 and 34, and the analog outputs of moisture content transducers 35 and 36, which are connected to control room 28 via multiple conductor cables 29, 30 and 31, supply the data which is necessary to perform computations which are displayed to facilitate monitoring of the vegetable oil refinery. This data is input to computer and display means which are associated with panel 56 of FIG. 3.

Fluctuation of the fluid level in vacuum dryer 21 poses a potential source of error when determining the overall loss, which is refining process loss plus vacuum drying, or finishing, loss. If the overall loss is determined over a period of operation without regard to the fluid level in vacuum dryer 21, an overall change in the level of fluid in vacuum dryer 21 over the period of operation would affect the overall loss; that is, an overall increase in the level of fluid in vacuum dryer 21 during the period of operation would result in an erroneously high overall loss and an overall decrease in the level of fluid in vacuum dryer 21 during the period of operation would result in an erroneously low overall loss. To facilitate accurate determination of loss in the refining process plus losses attributable to removal of water, entrained and dissolved air, and volatiles in the fluid as well as fluid vapor loss in vacuum dryer 21, level indicator switch 9 is mounted in vacuum dryer 21 and generates a signal when the fluid in vacuum dryer 21 is at a predetermined level. Level indicator switch 9 is connected to control room 28 via level indicator on/off switch 8. The overall loss can thus be determined for a period of operation between identical level conditions in vacuum dryer 21, and error in the overall loss due to overall change in the fluid level in vacuum dryer 21 is eliminated.

Figure 2:
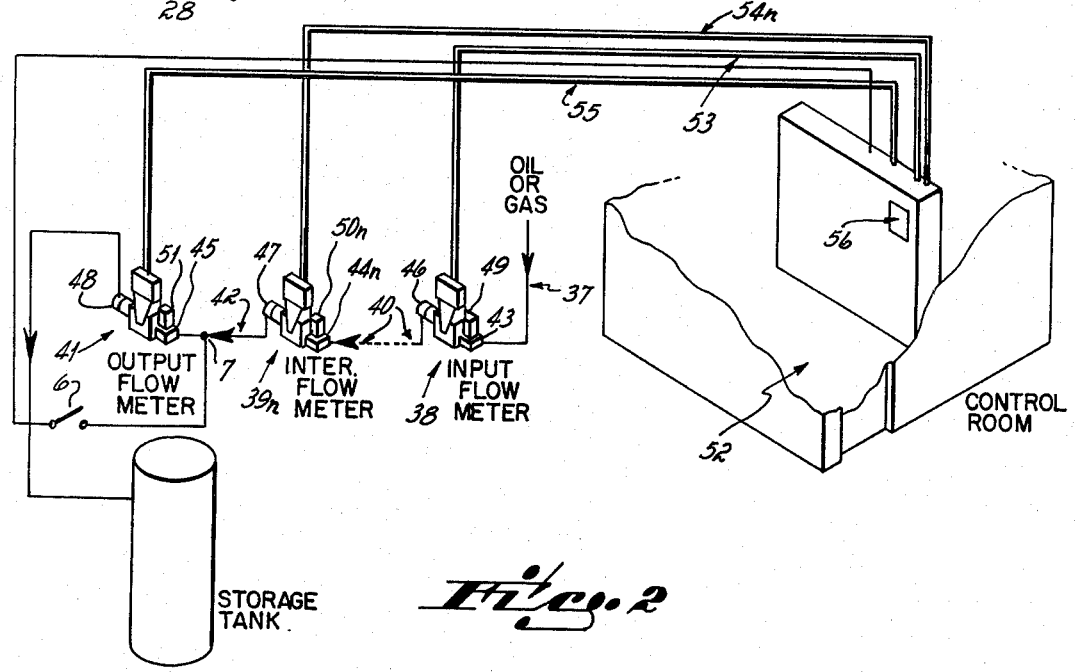
FIG. 2 is a diagrammatic representation of a fuel pipeline employing a monitor incorporating the features of the present invention.

Referring to FIG. 2, it should be noted that the monitor of the present invention also has application in the area of pipeline leakage detection and in determining the particular section of pipeline that contains a leak. As shown in FIG. 2, fuel is input to pipe 37 and is fed through input flow meter 38, which measures fuel input to the pipeline. Input flow meter 38 is connected to at least one intermediate flow meter $39_n$ via pipe 40. Intermediate flow meter 39 is connected to output flow meter 41 via pipe 42. Input flow meter 38, intermediate flow meter $39_n$ and output flow meter 41 have associated therewith pulse generators 43, 44 and 45; temperature transducers 46, 47 and 48; and moisture content transducers 49, $50_n$ and 51 which are connected to control room 52 via multiple conductor cables 53, $54_n$ and 55, respectively. The data from the various transducers is input to computer and display means which are associated with panel 56 of FIG. 3. On the basis of computations using the data, the monitor of the present invention is able to determine not only that there is a leakage condition, but also that the leakage condition is present in a length of pipeline between certain flow meters.

In order to facilitate accurate determination of the overall loss, pressure indicator switch 7 is mounted between the last intermediate flow meter $39_n$ and output flow meter 41. Pressure indicator switch 7 is connected to control room 52 via pressure indicator on/off switch 6. Determination of the overall loss for a period of pipeline operation between identical pressure conditions is analogous to determination of overall loss for a period of refinery operation between identical level conditions.

In most respects, the monitor employed in the pipeline of FIG. 2 is analogous to the monitor employed in the vegetable oil refinery of FIG. 1. Thus, except where necessary to point out distinctions between application of the monitor of the present invention to pipeline leakage detection and its application to refinery monitoring, discussion of pipeline leakage detection will not be considered in detail below.

Figure 3:
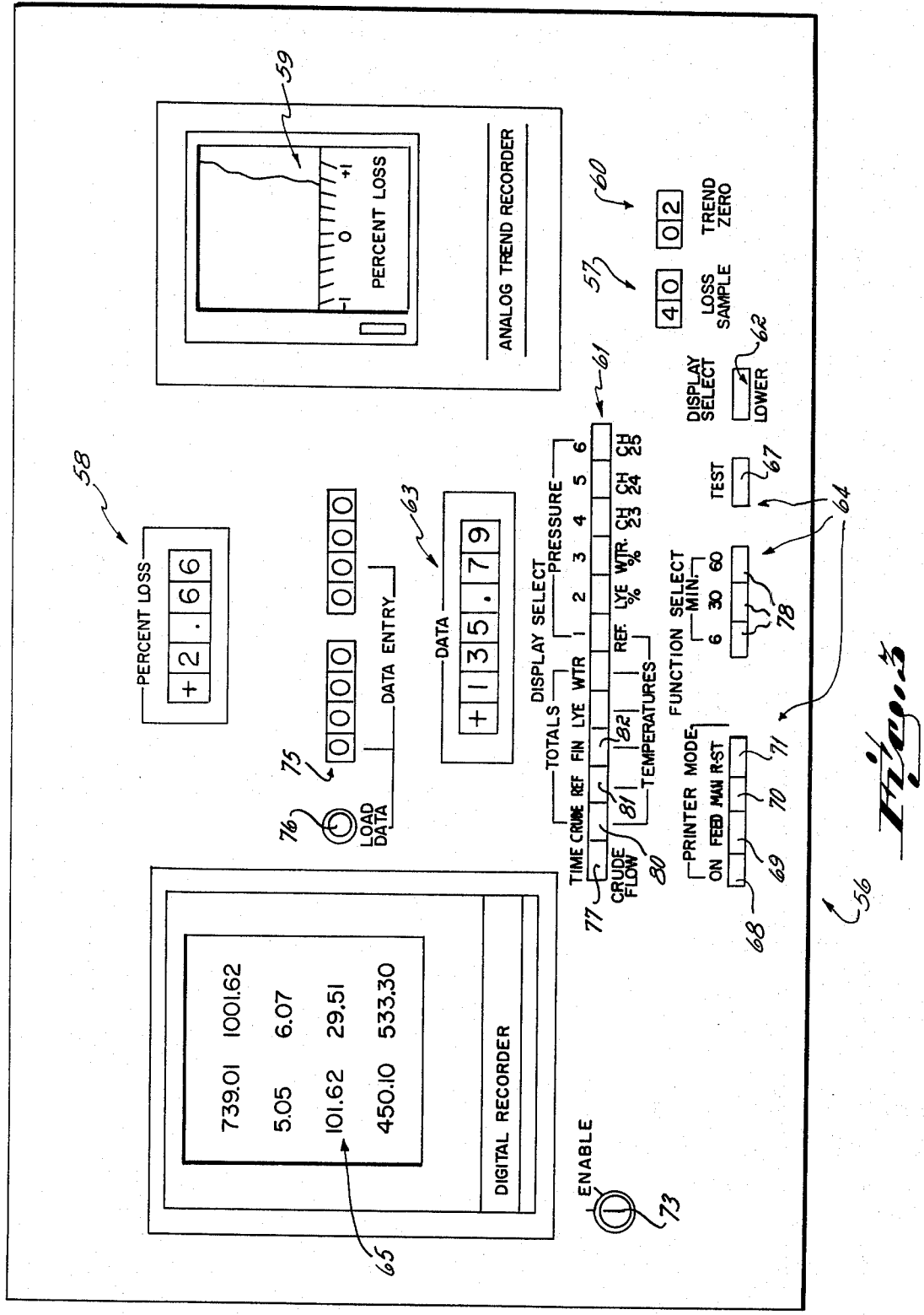
FIG. 3 is a front elevational view of a panel associated with the monitor of the present invention.

FIG. 3 depicts panel 56 which is associated with the arithmetic and logic circuitry which performs and displays the computations which will be described in detail below. Panel 56 includes sample number selector 57. Sample number selector 57 comprises, for example, two rotary decade switches which an operator uses to select the number of computations or statistical samples for the smoothing and trend technique for the series of short-term loss indications which will be described in detail below. Each short-term loss indication which is computed is displayed in LED display 58.

The series of short-term loss indications is also charted by strip chart recorder 59. Strip chart recorder 59 charts each short-term loss indication over a narrow plus or minus 1% span about a center loss percentage value selected by the operator using trend zero selector 60. For example, with trend zero selector 60 set to 2%, the strip chart record span is 1% to 3%. Trend zero selector 60 may also comprise two rotary decade switches. The operator sets trend zero selector 60 to the nearest whole number percentage value of the loss and writes the number indicated by trend zero selector 60 on the face of the strip chart record. The operator adds the number which he writes on the strip chart record to determine the short-term loss indication. By use of trend zero selector 60, errors due to hystereses in the strip chart recorder mechanism are reduced, and very small changes in the trend of the series of short-term loss indications can be easily detected by the operator.

Panel 56 includes a set of push button data switches 61. The operator can depress one of data switches 61 to display a parameter associated with the vegetable oil refinery being monitored. Each of data switches 61 is actually associated with two parameters. The operator uses display select switch 62 in association with data switches 61 to determine which of the parameters is displayed. Data for a parameter is input to panel 56 from a location in the refinery by a conventional transducer. Data switches 61 permit display of flow rates for various materials added to the refining process, amounts of material entered into the refining process during operation, temperatures, pressures, moisture contents, etc. The data for the selected parameter is displayed in a second LED display 63.

Panel 56 includes on/off switch 68 and a set of function selectors 64 which the operator uses to determine the mode of operation for (a) the arithmetic and logic circuitry and (b) printer 65. Modes of operation for the arithmetic and logic circuitry include a test mode which the operator selects with push button switch 67. These modes of operation will be described in detail below.

The printer controls include a set of three automatic print interval switches 78 by which the operator selects a six, thirty, or sixty minute interval for data printout and feed switch 69 for use in loading paper into printer 65. Other printer controls include manual printout command switch 70 and reset printout command switch 71 whose functions will be described below.

Panel 56 also includes key-operated data entry switch 73. Data entry switch 73 enables push button data input switch 76. Data input switch 76 is used by the operator to input data which he enters in manual data entry registers 75. Data entry switch 73, data input switch 76 and manual data entry registers 75 permit the operator to input data which the monitor requires for initialization, such as time of day. Manual data entry registers 75 also enhance flexibility of the monitor of the present invention by facilitating entry of other data. This feature will be described in more detail below.

Referring to FIGS. 1 and 3, when the operator activates the monitor of the present invention using on/off switch 68, the monitor commences an initialization phase. During the initialization phase, all registers in a random access memory are reset, the time of day which is entered by the operator using data entry switch 73, data input switch 76 and manual data entry registers 75 is read, and various factors are read from a read only memory. The factors from the read only memory are those which the monitor uses to compute net amounts of fluid in the absence of data entered by the operator using data entry switch 73, data input switch 76, and manual data entry registers 75. When the monitor has been initialized, printer 65 prints the message "up".

The arithmetic and logic circuitry then cycles through a series of steps to compute losses and d. plays and/or prints the losses. It also displays and/or prints parameters related to operation of the refinery being monitored. The information which is output is used by the operator to make adjustments in the operation of the refining process and for accounting records. In general the logic controls arithmetic computations by the arithmetic circuitry.

The monitor continuously updates the time of day which is read during the initialization phase. On the basis of elapsed time from initialization, the monitor performs certain computation and output functions. Thus, for example, data is printed out at only certain intervals of time in accordance with printout interval switches 78.

During each cycle, the monitor reads counters which are controlled by signals from pulse generators 25, 26 and 27 and then resets the counters. The monitor also receives signals from analog-to-digital (A/D) converters which are associated with temperature transducers 32, 33 and 34 and moisture content transducers 35 and 36. The arithmetic and logic circuitry then calculates the net amount of unrefined, refined, and finished fluid from the transducer data and flow meter correlation and the fluid coefficient of expansion factors read from read only memory. The net unrefined and refined fluid amounts are added to short-term loss accumulating registers. The net unrefined and finished fluid amounts are added to overall loss totalizing registers. The net unrefined, refined and finished fluid amounts are added to batch registers.

The monitor next determines whether or not an overall loss time delay has elapsed and preferably whether or not coincident processing conditions also exist. If so, the monitor computes an overall loss, that is, the total net amount of finished fluid in one totalizing register is subtracted from the total net amount of unrefined fluid in another totalizing register. The difference may be divided by the total net amount of unrefined fluid. The result is the overall loss in the refining and finishing processes expressed as a percentage of the total net amount of unrefined fluid input to the refinery for the period of operation involved. The unrefined and refined totalizing registers and overall loss time register are reset to zero after the overall loss has been computed.

The monitor preferably provides averaging of the overall loss by storing 'n' previous overall loss computations in 'n' storage registers. Each time the monitor computes an overall losss, the result replaces the least recent value stored. The monitor provides for indication of long-term overall loss by averaging the 'n' overall loss results. In effect, a moving average of overall loss for a time approximately equal to 'n' times the overall loss time delay is provided and updated at a period equal to the overall loss time delay.

In order to facilitate adjustment of parameters or other corrective measures, the monitor of the present invention also computes a series of short-term loss indications which depends not upon the total net unrefined and finished fluid amounts but rather upon accumulated net amounts of unrefined and refined fluids. The monitor enables the operator to enter a predetermined minimum amount, or sample size. During each interval of operation of the fluid flow system, the net amount of unrefined fluid which is accumulated must exceed the predetermined minimum amount before the monitor initiates the steps to compute a short-term loss indication for the interval of operation. This provides a resolution in the computations consistent with the repeatability of the flow meter measurements.

When the accumulated net amount of unrefined fluid exceeds the predetermined minimum amount during a first interval of operation of the fluid flow system, the accumulated net amount of refined fluid is subtracted from the accumulated net amount of unrefined fluid to compute a current loss. After the current loss is computed, the net unrefined and refined accumulating registers are reset to zero.

For the first interval of operation of the fluid flow system, the current loss is entered in a reference loss register and a reference loss increment register is reset to zero. The reference loss which in the case of the first interval of operation equals the current loss is then displayed as the short-term loss indication.

When the accumulated net amount of unrefined fluid again exceeds the predetermined minimum amount during each of a series of subsequent intervals of operation of the fluid flow system, in each instance the accumulated net amount or refined fluid is subtracted from the accumulated net amount of unrefined fluid to compute a current loss. After the current loss is computed, the net unrefined and refined accumulating registers are again reset to zero.

For each subsequent interval of operation of the fluid flow system, the reference loss in the reference loss register is subtracted from the current loss. The difference is then divided by the number which the operator has selected by means of sample number selector 57. The result of the division is a current loss increment. The current loss increment is compared to the reference loss increment in the reference loss increment register as to sign and magnitude. If the current loss increment differs in sign or is greater in magnitude than the reference loss increment (or, additionally, is zero), the current loss increment is entered in the reference loss increment register and is added to the reference loss, and the sum is displayed as the short-term loss indication. Otherwise, the reference loss increment is added to the reference loss, and the sum is displayed as the short-term loss indication. Thus, the effect of large random changes in short-term losses are reduced while optimum response to actual changes in the direction of deviation or rapid trends in deviation is preserved.

The advantage of this technique for indicating short-term losses are numerous. Short-term instabilities in the refining process are damped in two ways. First, each time a short-term loss indication is computed, an instantaneous loss during the interval of operation for which the computation is performed is distributed over the number of statistical samples selected by the operator by means of sample number selector 57. Secondly, rather than determine an instantaneous loss based solely on flowrates at any instant in time, short-term loss indications are based on short-term accumulated net amounts of unrefined and refined fluid equal to or greater than the predetermined minimum amount of fluid. Thus, surges and other variations in the amount of fluid processed during each interval of operation of the fluid flow system are effectively averaged over a number of such intervals.

This technique for indicating short-term losses provides on the record of strip chart recorder 59 a smooth steplike display of a trend for a series of intervals of operation of the fluid flow system in the case of changes in operational status of the refinery. Moreover, the operator can select an automated printout by printer 65 at 6, 30 or 60 minute intervals by means of printout interval switches 78. Thus, the monitor can also be made to print a record of changes in operational status of the refinery.

Since the deviation from the previously displayed loss, or reference loss, rather than a plurality of short-term loss computations are used to compute a subsequently displayed and/or printed short-term loss indication, the monitor of the present invention significantly reduces the size of random access memory. In some instances, this technique also reduces the number of arithmetic steps required to compute a series of short-term loss indications.

The monitor also permits the operator to command a printout of loss and parameter data in several ways. If the operator depresses manual printout command switch 70, printer 65 prints data without affecting the short-term accumulated net amounts of unrefined and refined fluid, the total net amounts of unrefined and finished fluid, or the batch amounts of unrefined, refined, and finished fluid. If the operator desires to reset the monitor, for example, after he has altered parameter or completed processing a batch of unrefined fluid, he depresses reset printout command switch 71. When reset printout command switch 71 is depressed, data is printed and the batch amounts of unrefined, refined and finished fluid are reset to zero.

DETAILED DESCRIPTION OF SYSTEM AND OPERATION

The monitor of the present invention will now be described in conjunction with the operational flow diagram of FIG. 4 and the schematic diagram of the arithmetic and logic circuitry of FIG. 5. Where it is necessary to complete understanding, reference will also be made to FIG. 3.

The operator activates the monitor of the present invention by means of on/off switch 68 in FIG. 3. Immediately after the monitor is activated, an initilization phase is commenced.

Figure 4A:
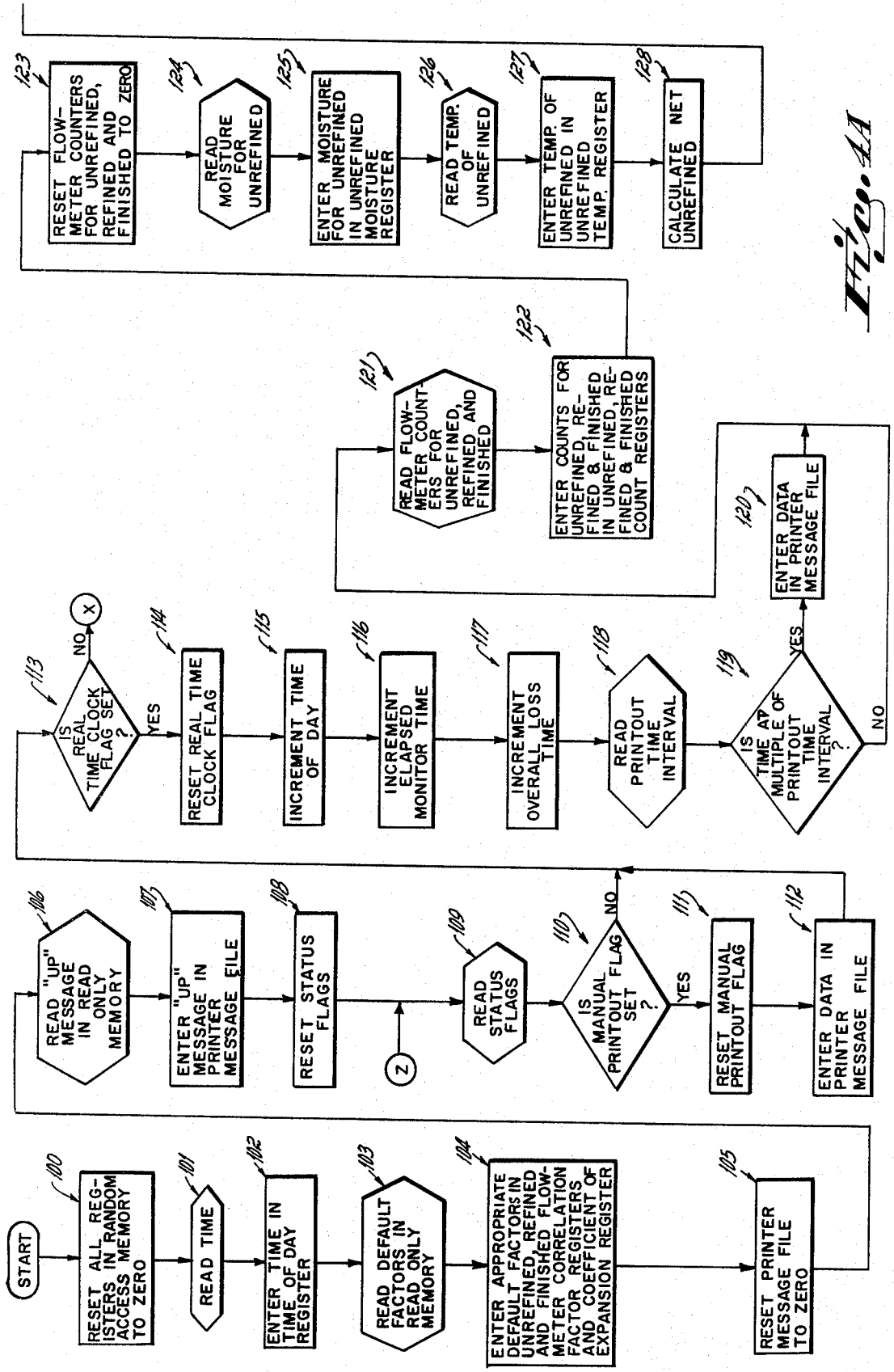
FIG. 4, including FIGS. 4A-4D connected as shown, is a flow diagram of the operation of the monitor of the present invention.

The registers in a random access memory are reset to zero as indicated by machine function 100 in FIG. 4A.

To effect entry of the time of day the operator enters the time of day by positioning display select switch 62 in FIG. 3 so that the upper display parameters are selected. He next operates data switch 77 in the set of data switches 61. The operator then enters the time of day in manual data entry registers 75. The operator enables data input key 76 by positioning data entry switch 73 to the enable position. Finally, the operator depresses data input key 76 to enter the time of day into the monitor.

The monitor reads the time of day in manual data entry registers 75 as indicated by machine function 101 in FIG. 4A. The monitors enters the time of day in a register in random access memory as indicated by machine function 102.

Figure 4B:
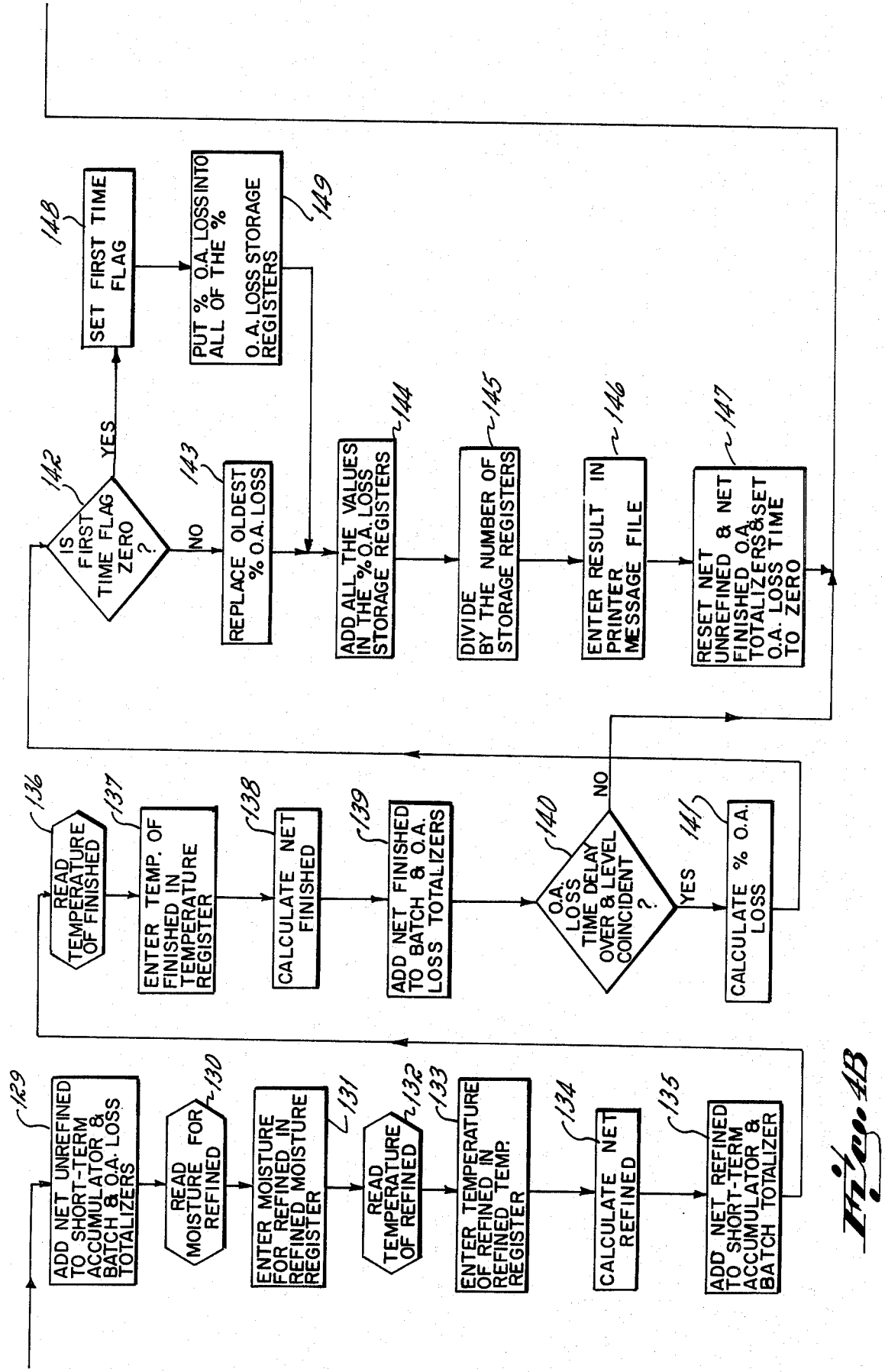
Figure 5A:
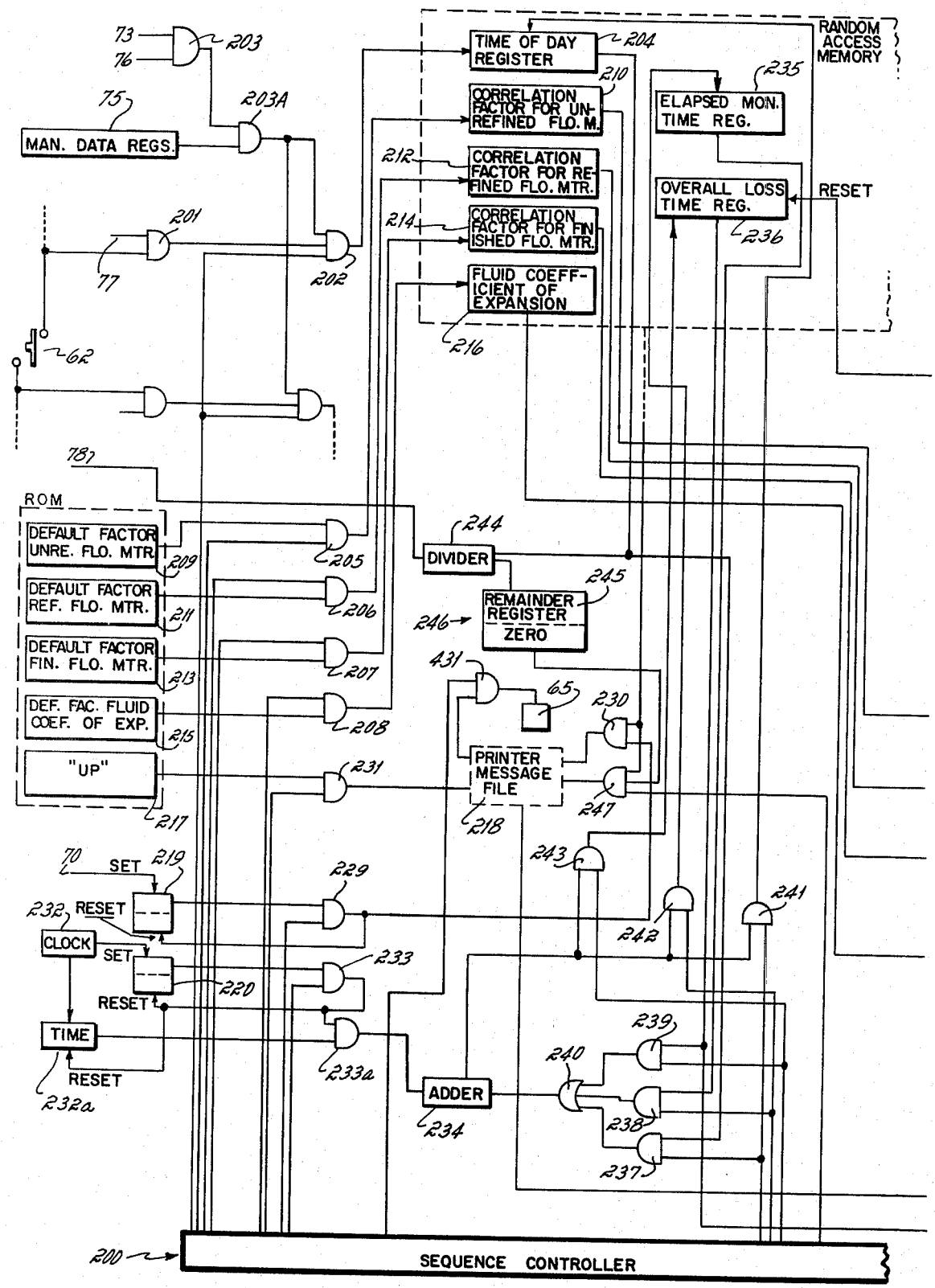
FIG. 5, including FIGS. 5A-5D connected as shown, is a schematic diagram of the monitor of the present invention.

Referring to FIG. 5, sequence controller 200 steps the logic and arithmetic circuitry of FIG. 5 through the operational sequence which is depicted in FIG. 4. As shown in FIG. 5A, the operator positions display select switch 62 to select the upper display to initiate entry of the time of day. A signal from display select switch 62 is input to AND gate 201. The operator then depresses data switch 77. A signal from data switch 77 enables AND gate 201. A signal from AND gate 201 is input to AND gate 202. The operator next positiions data entry switch 73 to the enable position. The operator then depresses data input key 76. A signal from data input key 76 enables AND gate 203. A signal from AND gate 203 gates the time of day, which the operator has entered in manual data entry registers 75, via AND gate 203A to the input of AND gate 202. During the initialization phase, sequence controller 200 and the signal from AND gate 201 gate data in manual data entry registers 75 via AND gate 202 to time of day register 204. The use of data in time of day register 204 will become apparent hereinafter.

Returning to FIG. 4A, the monitor of the present invention continues the initialization phase by reading default factors in a read only memory as indicated by machine function 103. These default factors, including data for correlation among unrefined, refined, and finished flow meters 11, 19 and 23 (FIG.1) and a factor for the fluid coefficient of expansion, are entered into appropriate registers in random access memory as indicated by machine function 104. The use of the default factors will be described in detail below.

As shown in FIG. 5A, a signal from sequence controller 200 gates a default factor for the unrefined flow meter in read only memory register 209 via AND gate 205 to correlation factor for unrefined flow meter register 210. Subsequent signals from sequence controller 200 then sequentially gate (a) a default factor for the refined flow meter in read only memory register 211 via AND gate 206 to correlation factor for refined flow meter register 212, (b) a default factor for the finished flow meter in read only memory register 213 via AND gate 207 to correlation factor for finished flow meter register 214, and (c) a default factor for fluid coefficient of expansion in read only memory register 215 via AND gate 208 to fluid coefficient of expansion register 216.

The flow meter correlation default factors in read only memory registers 209, 211, and 213 are employed in net fluid amount computations which will be described in detail below. These default factors are used unless other correlation factors are entered, for example, by a manual data entry performed in a manner similar to that considered in connection with operator entry of the time of day. The value of the default factor for each flow meter in read only memory registers 209, 211, and 213 is based either on (a) individual calibration of each flow meter or (b) information in literature which is supplied by the manufacturer of each flow meter. The default factor for the fluid coefficient of expansion in read only memory register 215 is also used in net fluid amount computations and is the nominal value for the fluid coefficient of expansion for the fluid being refined. This factor may be altered by a manual data entry. The default factors are entered into read only memory at the time the monitor is assembled.

Referring again to FIG. 4A, after the default factors have been entered into random access memory, the message file for printer 65 (FIG. 3) is reset as indicated by machine function 105. Immediately thereafter the message "up" is read from read only memory and entered in the printer message file as indicated by machine functions 106 and 107, respectively. A final step in the initialization phase is indicated by machine function 108 where data input flags, controlled by signals from various transducers and by panel 56 (FIG. 3) associated with the monitor, are reset.

Referring to FIG. 5A, a signal from sequence controller 200 gates the "up" message in read only memory register 217 via AND gate 231 to printer message file 218. Signals from sequence controller 200 also reset monitor data input flags. Data input flags such 219 comprise bistable circuit elements, or flip flops.

Returning to FIg. 4A, the first step of a monitoring cycle is to etemine whether or not any of the data input flags have been set. Thus, the monitor reads the data input flags as indicated by machine function 109.

The monitor first determined whether or not the manual printout flag is set as indicated by machine function 110. If machine function 110 indicates that the manual printout flag is set, the monitor resets the manual printout flag and enters data with regard to time of day, parameters, and loss in the printer message file as indicated by machine functions 111 and 112, respectively.

As shown in FIG. 5A, the operator sets manual printout flag 219 when he depresses manual printout command switch 70. If manual printout flag 219 is set, a signal from manual printout flag 219 is input to AND gate 229. A signal from sequence controller 200 enables AND gate 229. Consequently, a signal from AND gate 229 is input to AND gate 230. The signal from AND gate 229 resets manual printout flag 219 and gates data contained in registers in random access memory via AND gate 230 to printer message file 218.

Referring again to FIG. 4A, after the monitor completes steps 111 and 112 associated with an operator commanded printout or if machine function 110 indicates that the manual printout flag is not set, the monitor determines whether or not the real time clock flag is set as indicated by machine function 113. If machine function 113 indicates that the real time clock flag is not set, the monitor proceeds to a printout sequence which will be described below. If machine function 113 indicates that the real time clock flag has been set, the monitor resets the real time clock flag as indicated by machine function 114. The monitor then increments (a) the time of day, (b) the elapsed monitor time, and (c) the overall loss time as indicated by machine functions 115, 116, and 117, respectively.

As shown in FIG. 5A, electronic clock 232 is connected to the set input of real time clock flag 220. Sequence controller 200 and real time clock flag 220 are connected to the input of ANd gate 233. When AND gate 233 is enabled, a signal from AND gate 233 gates the time increment in clock pulse counter 232a via AND gate 233a to adder 234. The signal from AND gate 233 also resets real time clock flag 220 and clock pulse counter 232a. Sequential signals from sequence controller 200 sequentially gate data in time of day register 204, elapsed monitor time register 235, and overall loss time register 236 via AND gates 237, 238, and 239, respectively, and OR gate 240 to adder 234. The sequential signals from sequence controller 200 also gate incremented values for the time of day, elapsed monitor time, and overall loss time via AND gates 241, 242, and 243, respectively, to registers 204, 235, and 236, respectively.

Referring again to FIG 4A, after the monitor increments the time of day, elapsed monitor time, and overall loss time, it reads the automatic printout time interval as indicated by machine function 118 and determine whether or not the time of day is at a multiple of the printout time interval as indicated by machine function 119. If machine function 119 indicates that an automatic printout should be performed, the monitor enters data with regard to time of day, parameters, and loss in the printer message file as indicated by machine function 120.

Referring to FIG. 5A, to determine whether or not an automatic printout should be preformed data in time of day register 204 is divided by data in printout time interval switch 78 in divider 244. The remainder in divider 244 enters register 245 of comparator 246. Comparator 246 compares data in register 245 with the value zero. If data in register 245 is zero, signals from comparator 246 and sequence controller 200 gate time of day, parameter, and loss data in random access memory via AND gate 247 to printer message file 218.

Returning to FIG. 4A, after step 119 or step 120 associated with an automatic printout the monitor reads the counts which represent the number of pulses generated by pulse generators 25, 26, and 27 associated with flowmeters 11, 19, and 23 (FIG. 1), respectively, as indicated by machine function 121. The counts in respective counters enter registers in random access memory, and the counters are reset as indicated by machine functions 122 and 123, respectively. The monitor then proceeds to compute from the counts the net amounts of unrefined, refined, and finished fluid.

To calculate the net amount of fluid which has been metered at each flow meter station each flow meter count in random access memory is corrected for moisture content, temperature, and meter calibration. The moisture contained in the unrefined fluid at flow meter 11 as determined by moisture content transducer 35 (FIG. 1) is read by the monitor as indicated by machine function 124 and entered in a register in random access memory as indicated by machine function 125. Similarly, the temperature of the unrefined fluid at flow meter 11 as determined by temperature transducer 32 (FIG. 1) is read by the monitor and entered in a register in random access memory as indicated by machine functions 126 and 127, respectively. The net amount of unrefined fluid is then calculated as indicated by machine function 128. The net amount of unrefined fluid calculated at step 128 is then added to the batch amount of unrefined fluid, to the total net amount of unrefined fluid, and to the short-term accumulated net amount of unrefined fluid in registers in random access memory as indicated by machine function 129 (FIG. 4B).

As shown in FIG. 4B, the monitor performs a similar procedure to determine the net amount of refined fluid as it follows to determine the net amount of unrefined fluid. Thus, the moisture content and temperature of the refined fluid at flow meter 19 as determined by moisture content transducer 36 and temperature transducer 33 (FIG. 1) are read and entered and registers in random access memory as indicated by machine functions 130, 131, 132, and 133, respectively. The net amount of refined fluid is then calculated as indicated by machine function 134 and added to the batch amount of refined fluid and to the short-term accumulated net amount of refined fluid in registers in random access memory as indicated by machine function 135.

Since the finishing process contemplates the use of vacuum dryer 21 (FIG. 1), the monitor does not necessarily employ a moisture content transducer to determine the amount of moisture in finished fluid. Thus, the monitor preferably reads only the temperature of the finished fluid and enters the temperature of the finished fluid in a register in random access memory as indicated by machine functions 136 and 137, respectively. The net amount of finished fluid is then calculated and added to the batch amount of finished fluid and to the total net amount of finished fluid in registers in random access memory as indicated by machine functions 138 and 139, respectively. A moisture content transducer could be employed if the finishing process did not call for complete vacuum drying. Thus, a moisture content transducer would be employed at each flow meter station as is the case in the pipeline leakage detection monitor depcited in FIG. 2.

Figure 5B:
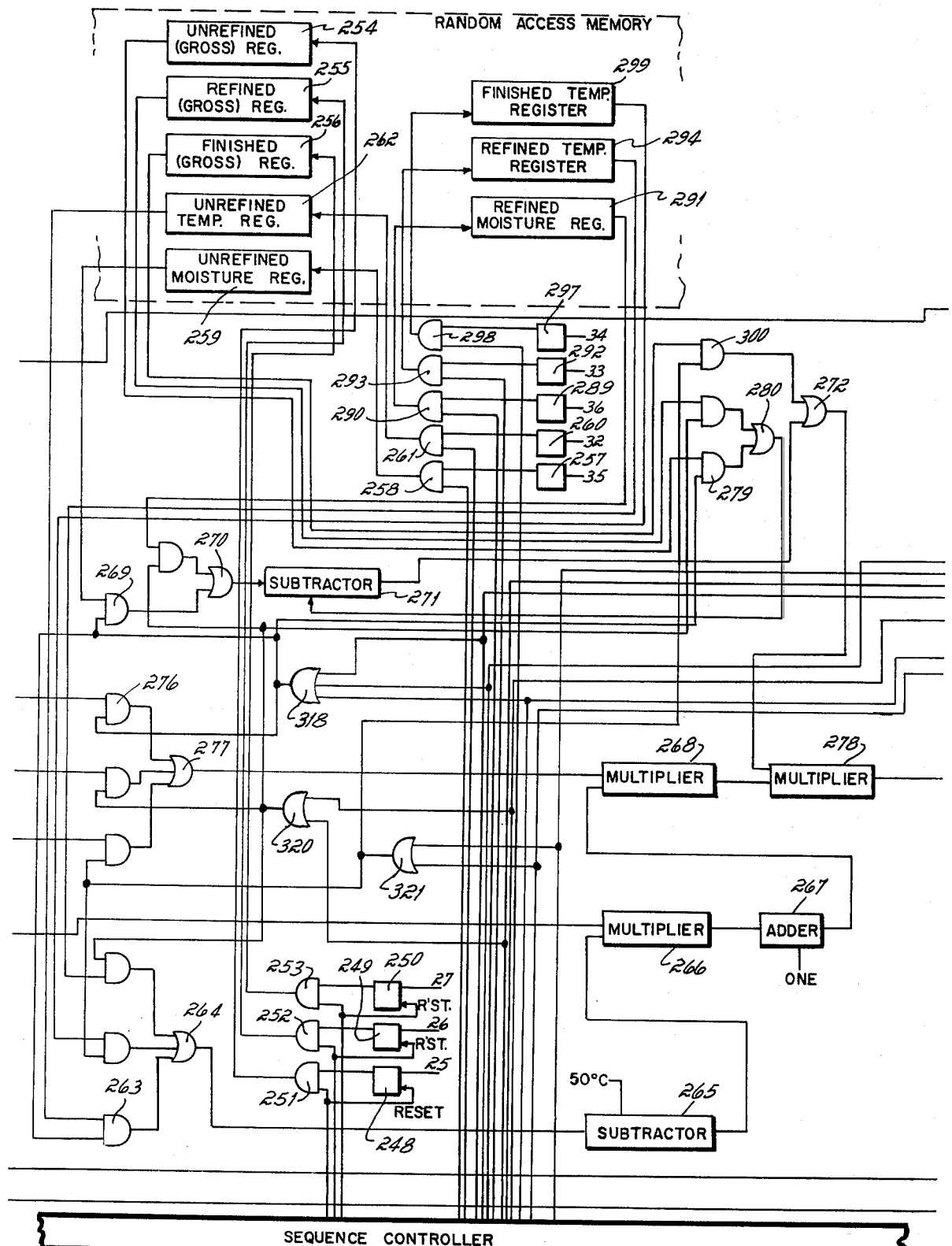

As shown in FIG. 5B, unrefined counter 248 counts pulses from pulse generator 25 associated with flow meter 11 (FIG. 1). Similarly, refined counter 249 and finished counter 250 count pulses from pulse generators 26 and 27 associated with flow meters 19 and 23 (FIG. 1), respectively. Signals from sequence controller 200 sequentially gate the counts in counter 248, 249 and 250 via AND gates 251, 252, and 253 to unrefined (gross) register 254, refined (gross) register 255, and finished (gross) register 256, respectively. The sequential signals from sequence controller 200 also reset counters 248, 249, and 250.

A signal from moisture content transducer 35 for unrefined fluid is input to A/D converter 257. A signal from sequence controller 200 gates the output from A/D converter 257 via AND gate 258 to unrefined moisture register 259. Similarly, a signal from temperature transducer 32 for unrefined fluid is input to A/D converter 260. A signal from sequence controller 200 gates the output from A/D converter 260 via AND gate 261 to unrefined temperature register 262.

To calculate the net amount of unrefined fluid, a signal from sequence controller 200 via OR gate 318 gates data in unrefined temperature register 262 via AND gate 263 to the input of OR gate 264. The temperature of the unrefined fluid enters subtractor 265 via OR gte 264. Subtractor 265 subtracts the temperature of the unrefined fluid from 50° C. The difference in subtractor 265 enters multiplier 266. Multiplier 266 multiplies the difference between 50° C and the temperature of the unrefined fluid from subtractor 265 by data in fluid coefficient of expansion register 216 (FIG. 5A). The product in multiplier 266 enters adder 267 where adder 267 adds the product from multiplier 266 to one. The sum in adder 267 enters multiplier 268.

The signal from sequence controller 200 via OR gate 318 also gates data in unrefined moisture register 259 via AND gate 269 to the input of OR gte 270. The unrefined moisture content enters subtractor 271 via OR gate 270. The signal from OR gate 318 gates data in unrefined (gross) register 254 via AND gate 279 and OR gate 280 to subtractor 271. Subtractor 271 subtracts the moisture content from the gross amount of unrefined fluid. The difference in subtractor 271 enters multiplier 278 via OR gate 272.

The signal from sequence controller 200 via OR gate 318 also gates data in correlation factor for unrefined flow meter register 210 (FIG. 5A) via AND gate 276 and OR gate 277 to multiplier 268. Multiplier 268 multiplies the temperature correction factor for the unrefined fluid represented by the sum in adder 267 by the unrefined flow meter correlation factor. The product in multiplier 268 enters multiplier 278.

Multiplier 278 computes the product of the moisture corrected gross unrefined fluid amount and the combined temperature correction and flow meter correlation factor to produce the net amount of unrefined fluid. The output of multiplier 278 is applied to one input of adder 283 (FIG. 5C).

A signal from sequence controller 200 gates the data in net unrefined short-term register 285 via AND gate 308 to adder 283, and the resultant sum is returned to net unrefined short-term register 285 via AND gate 305 thereby updating the short-term accumulated net amount of unrefined fluid. In similar manner, the net amount of unrefined fluid is added to the total net amount of unrefined fluid in register 314 via AND gates 307 and 304 and to the batch amount of unrefined fluid in register 441 via AND gates 306 and 303, thereby updating the total net amount of unrefined fluid and the batch amount of unrefined fluid, respectively.

Computation of the net amount of refined fluid parallels computation of the net amount of unrefined fluid. Referring to FIG. 5B, a signal from moisture content transducer 36 is input to A/D converter 289. A signal from sequence controller 200 gates the output of A/D converter 289 via AND gate 290 to refined moisture register 291. A signal from temperature transducer 33 is input to A/D converter 292. A signal from sequence controller 200 gates the output of A/D converter 292 via AND gate 293 to refined temperature register 294.

The calculation of the net amount of refined fluid involves use of data in refined (gross) register 255, refined temperature register 294, refined moisture register 291, correlation factor for refined flow meter register 212 (FIG. 5A), and fluid coefficient of expansion register 216 (FIG. 5A). The net amount of refined fluid is added to the short-term accumulated net amount of refined fluid in register 296 (FIG. 5C), thereby updating the short-term accumulated net amount of refined fluid. The net amount of refined fluid is also added to the batch amount of refined fluid in register 442, thereby updating the batch amount of refined fluid.

The computation of the net amount of finished fluid parallels in all respects but one the computation of the net amounts of unrefined and refined fluid. As pointed out above with regard to finished fluid, vacuum dryer 21 (FIG. 1) is assumed to remove all moisture. Thus, no moisture content transducer has been employed at the finished fluid flow meter station. Referring to FIG. 5B, a signal from temperature transducer 34 is input to A/D converter 297. A signal from sequence controller 200 gates the output of A/D converter 297 via AND gate 298 to finished temperature register 299.

The computation of the net amount of finished fluid involves data in finished (gross) register 256, finished temperature register 299, correlation factor for finished flow meter register 214 (FIG. 5A), and fluid coefficient of expansion register 216 (FIG. 5A). Since the finished fluid is assumed to have no moisture content, subtractor 271 is not used in the computation of the net amount of finished fluid. Instead, a signal from sequence controller 200 via OR gate 321 gates data in finished (gross) register 256 via AND gate 300 and OR gate 272 directly to multiplier 278. The net amount of finished fluid is added to the total net amount of finished fluid in register 319 thereby updating the total net amount of finished fluid. The net amount of finished fluid is also added to the batch amount of finished fluid in register 302 thereby updating the batch amount of finished fluid.

In summary, fluid which flows through each flow meter along the refining process in FIG. 1 drives a rotor which is a component of the flow meter. The rotor in turn drives a pulse generator. The pulse generator is connected to a counter which counts pulses from the pulse generator. The count is representative of a volume of fluid which has flowed through the flow meter.

The moisture content of fluid which flows through each flow meter along the refining process in FIG. 1 can vary. For example, water is added to fluid in water wash centrifuge 17 and water is removed from fluid in vacuum dryer 21. Indications with regard to loss of vegetable oil will not be meaningful unless the volumes of fluid attributable to water are subtracted from flow meter volumetric measurements before loss computations are performed. Thus, moisture content transducers at the unrefined and refined flow meter stations measure volumes of water in the fluid. The monitor subtracts volumes of water measured by the unrefined and refined moisture content transducers from volumes of fluid measured by the unrefined and refined flow meters. It is generally not necessary to account for moisture content of finished fluid since vacuum dryer 21 is designed to remove water before the fluid flows through the finished flow meter.

The temperature of fluid which flows through each flow meter along the refining process in FIG. 1 can also vary. Unrefined fluid, for example, which is often stored in an outdoor tank, may be flowed through a heater (not shown) before entering refining centrifuge 13. Since the volume of fluid varies with temperature, flow meter volumetric measurements must be corrected to a standard temperature or indications with regard to loss of vegetable oil will not be meaningful. For the vegetable oil refining process used to illustrate the applicaton of the monitor of the present invention, 50° C. is chosen as the standard temperature. 50° C. is approximately the average temperature of the fluid over the period of time during which the fluid is transformed from unrefined to finished product. Temperature transducers measure the temperature of the fluid at the flow meter stations. The monitor subtracts the measured temperature from 50° C. and multiplies the difference by the coefficient of expansion for the fluid, which may be (a) the nominal, or default factor, value for the coefficient of expansion for the fluid being refined, or (b) a value for the coefficient of expansion for the fluid being refined which is determined by laboratory analysis and manually entered by the operator. Since the fluid coefficient of expansion varies with water or impurities in the vegetable oil, a different fluid coefficient of expansion could be determined for the fluid which flows through each flow meter station. In practice, however, applicants have found that satisfactory monitoring can be performed using a nominal, or average, value for the coefficient of expansion for fluid along the refining process in FIG. 1 to determine net fluid amounts. The product of (a) the temperature difference at each flow meter station and (b) the coefficient of expansion for the fluid is added to one to compute temperature correction factors for the fluid which flows through each flow meter station. The moisture compensated flow meter volumetric measurements are multiplied by the respective temperature correction factors.

The net fluid amounts for each flow meter station are then computed by multiplying each moisture compensated and temperature corrected flow meter volumetric measurement by a flow meter correlation factor. As described above, the flow meter correlation factors may be the flow meter calibration, or default factor, values obtained by conventional flow meter calibration methods or from flow meter manufacturer data. As will be described below the losses for vegetable oil computed by the monitor of the present invention are based on net fluid amounts to significantly reduce inaccuracies due to water content of the volume of fluid measured by the flow meters, temperature variations along the refining process, and differences among the flow meters.

Referring to FIG. 4B, the monitor determines whether or not the overall loss time delay has expired as indicated by machine function 140. If machine function 140 indicates that the overall loss time is greater than or equal to the overall loss time delay, the monitor calculates the overall loss as a percentage of the total net amount of unrefined fluid as indicated by machine function 141. Machine function 142 next determines if first time flag 332 (FIG. 5C) is in its zero or reset state. If the zero state is present, this indicates the computation of overall loss is the first such computation since power was applied to the monitor or since a monitor reset. The monitor then sets the first time flag 332 (FIG. 5C) as indicated by machine function 148 and proceeds to deposit the value of the computed overall loss into all '$n$' locations of percent overall loss storage register 334 (FIG. 5C) as indicated by machine function 149. Percent overall loss storage register 334 (FIG. 5C) is structured as a FIFO (first in first out) shift register '$n$' words long with a parallel load enable. If machine function 142 indicates that the first time flag 332 (FIG. 5C) is set, the monitor enters the overall loss computation into the shift input of FIFO register 334 (FIG. 5C) and hence replaces the least current value as indicated by machine function 143. In either event, the '$n$' values stored in FIFO register 334 (FIG. 5C) are added together and divided by '$n$' and the result entered in the printer message file as indicated by machine functions 144, 145, and 146. The total net amount of unrefined fluid in register 314, the total net amount of finished fluid in register 319, and the overall loss time in register 236 are next set to zero as indicated by machine function 147.

The accuracy of any individual overall loss computation can be enhanced by making the performance of the computation conditional upon similar processing conditions or dynamic conditions being in existence at the start and at the finish of the overall loss computation period. For example, in the case of a fluid flow system a difference in the measurements of fluid into and out of the fluid flow system can be due to compressibility of the fluid or a changing level in some intermediate storage vessel. In such cases, the accuracy of the overall loss computation is improved when a device such as a level detector switch or pressure switch, provides a signal enabling the performance of the overall loss computation. It is also inferred that a suitable process measurement signal could also be compared to some preset value held in a storage register, and, hence, the detection of coincident processing conditions plus or minus some tolerance value would be used. In either case, the technique is the same, and overall loss accuracy is improved.

Moreover, conditions can occur where this detection of coincident processing conditions may extend the period beyond some time limit where errors due to non-coincident processing conditions would be insignificant when compared to the large value of the measurements of fluid. In this case, an upper time limit can be used to enable the performance of an overall loss computation even though the process conditions are not at coincidence. In like manner, whenever values are selected where the number of samples being conditioned or averaged is very large relative to the surge capacity of the process located between the input and output stations, then the signal for detection of coincident processing conditions may be overriden or eliminated. As the method of detecting and utilizing the described coincident processing conditions is disclosed in applicants' above-identified application, no further detailed description of the technique will be included herein.

Referring to FIG. 5C, the monitor determines if the overall loss time in register 236 is greater than or equal to the overall loss time delay 78 by means of comparator 324. If so, comparator 324 together with the coincident level or pressure signal and a signal from sequence controller 200 enables AND gate 331 to start the overall loss computation machine function 141 (FIG. 4B). The overall loss computation is performed as follows.

The total net amount of unrefined fluid in register 314 is applied to one input of subtractor 327, and the total net amount of finished fluid in register 319 is applied to the other input of subtractor 327. The difference is preferably divided by the total net amount of unrefined fluid in register 314 by divider 328, which is enabled by the signal from AND gate 331. The result is applied to the inputs of AND gates 339 and 333. If first time flag 332 is reset, indicating the first overall loss computation since power on or reset, output $\overline{Q}$ enables the result via AND gate 333 to be loaded into all '$n$' registers 334. If first time flag 332 is set, the Q output enables the result via AND gate 339 to be loaded into the shift input of FIFO register 334 and shifts the least current value out of FIFO register 334.

The outputs of FIFO register 334 comprising 'n' results are added in adder 435, and the result is divided by the value 'n' in register 436 by divider 437. Divider 437 is enabled by a signal from sequence controller 200 at machine function 145 (FIG. 4B). The result is entered in the printer message file 218 via AND gate 438 which is enabled by a signal from sequence controller 200 at machine function 146 (FIG. 4B). A signal from sequence controller 200 then resets to zero the total net amount of unrefined fluid in register 314, the total net amount of finished fluid in register 319, and the overall loss time in register 236 at machine function 147 (FIG. 4B).

Returning to FIG. 4B, the monitor proceeds from the overall loss computation cycle to the short-term loss computation cycle after one of two steps. If machine function 140 indicates the coincident level or pressure does not exist or the overall loss time delay has not elapsed, the monitor bypasses the overall loss computation cycle. Otherwise, after the overall loss computation cycle is complete, that is, after step 147, the monitor proceeds to the short-term loss computation cycle.

The monitor initiates the short-term loss computation cycle by reading a minimum unrefined sample size, or predetermined minimum amount, as indicated by machine function 159. The minimum unrefined sample size read at step 159 constitutes the threshold amount of unrefined fluid which must be input to the refining process during each of a series of intervals of operation before a short-term loss computation cycle will be performed by the monitor.

The minimum unrefined sample size may be based on an amount which is consistent with the predicted repeatability of the fluid measurement instrumentation for obtaining a desired resolution. Otherwise, the minimum unrefined sample size may be based on the amount of unrefined fluid which must be input to the refining process before refined fluid is output from the refining process to the finishing process. This amount depends upon the volume of the various chemical processing elements and interconnecting pipes used in the refinery. In this manner, the monitor accounts for the propagation constant of fluid through the refining process. Accumulation of a minimum unrefined sample size before initiating computation of a short-term loss indication tends to minimize the effect of surges or instability in operation of the refining process.

The monitor then determines whether or not the short-term accumulated net amount of unrefined fluid is greater than the minimum unrefined sample size as indicated by machine function 160. If machine function 160 indicates that the short-term accumulated net amount of unrefined fluid exceeds the minimum unrefined sample size, the monitor computes the current loss preferably as a percentage of the short-term accumulated net amount of unrefined fluid input to the refining process being monitored as indicated by machine function 161. The short-term accumulated net amounts of unrefined and refined fluid in registers 285 and 296 (FIG. 5C) are then reset to zero as indicated by machine function 161a.

The monitor next determines whether or not the short-term loss cycle flag is set as indicated by machine function 162. The first time that the monitor enters the short-term loss computation cycle, machine function 162 will indicate that the short-term loss cycle flag is not set. Accordingly, the monitor enters the current percentage loss computed at step 161 in the reference percentage loss register as indicated by machine function 163. The monitor thereafter sets the short-term loss cycle flag and also resets the reference loss increment to zero as indicated by machine functions 164 and 165, respectively.

During subsequent short-term loss computation cycles, machine function 162 will indicate that the short-term loss cycle flag is set. As a result, the monitor reads the number of statistical samples which the operator has entered by means of sample number selector 57 (FIG. 3) as indicated by machine function 166. The number which the operator enters in sample number selector 57 (FIG. 3) actually is a smoothing or averaging factor. The effect of this smoothing or averaging factor, as will be described in more detail below, is that (a) sudden disturbances and (b) changes in operation of the refining process are not reflected entirely in the short-term loss indication computed for the just elapsed interval of operation but are spread over a number of intervals of operation corresponding to the number in sample number selector 57 (FIG. 3).

The monitor then determines whether or not the number of computations or statistical samples is one as indicated by machine function 167. If machine function 167 indicates that the number of statistical samples is one, the monitor enters the current percentage loss computed at step 161 in the reference percentage loss register as indicated by machine function 168. Thus, if the number of statistical samples is one, the monitor displays the current percentage loss of unrefined fluid in the refining process as the short-term loss indication, as will be described in more detail below.

If machine function 167 indicates that the number of statistical samples exceeds one, the current percentage loss of unrefined fluid is smoothed or averaged over the number of statistical samples read at step 166, thereby distributing the loss of unrefined fluid which occurs during any one interval of operation over a number of intervals corresponding in number to the number of statistical samples.

The monitor calculats a current loss increment based on the current percentage loss and the number of statistical samples as indicated by machine function 169. Thereafter, the monitor determines whether or not the current loss increment has the same sign as the reference loss increment as indicated by machine function 170. If the signs are different, the current loss increment is substituted for the reference loss increment as indicated by machine function 171.

If machine function 170 indicates that the signs of the current and reference loss increments are the same, the monitor determines whether or not the magnitude of the current loss increments exceeds the magnitude of the reference loss increment as indicated by machine function 172. If machine function 172 indicates that the magnitude of the current loss increment exceeds the magnitude of the reference loss increment, the current loss increment is substituted for the reference loss increment as indicated by machine function 171.

If the magnitude of the current loss increment does not exceed the magnitude of the reference loss increment, the monitor determines whether or not the current loss increment is equal to zero as indicated by machine function 173. If machine function 173 indicates that the current loss increment equals zero, zero is substituted for the reference loss increment as indicated by machine function 171.

Where the number of statistical samples exceeds one, the reference loss increment is added to the reference percentage loss as indicated by machine function 174 whereby any loss is effectively distributed over a series of short-term loss indications. The reference percentage loss determined either by machine function 163, machine function 168, or machine function 174 is displayed in LED display 58 (FIG. 3) as indicated by machine function 175.

The monitor also reads the trend recorder scale factor which the operator enters in trend zero selector 60 (FIG. 3), computes a trend recorder signal, and outputs the signal to trend recorder 59 (FIG. 3) as indicated by machine functions 176, 177, and 178, respectively. Trend recorder 59 (FIG. 3), therefore, records either (a) the current percentage losses of unrefined fluid, if the number of statistical samples is one, or (b) a trend loss for unrefined fluid input to the refining process, if the number of statistical samples is greater than one, providing a step-like characteristic for a series of short-term loss indications in the event of sudden disturbances and changes which occur during operation of the refining process.

Figure 5D:
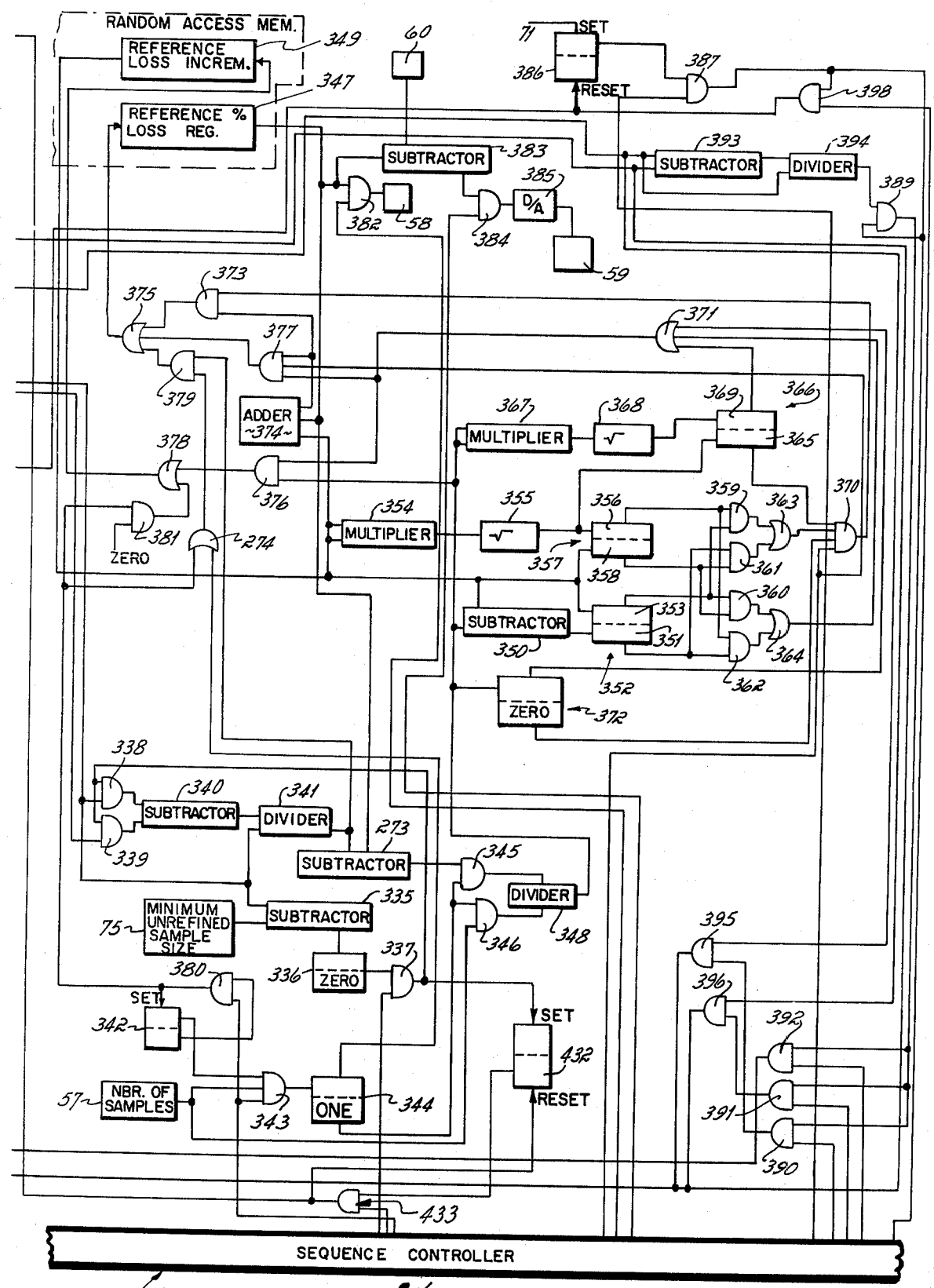

Referring to FIG. 5D, the minimum unrefined sample size from manual data entry registers 75 enters subtractor 335. The short-term accumulated net amount of unrefined fluid in register 285 (FIG. 5C) also enters subtractor 335. Subtractor 335 generates the difference between the short-term accumulated net amount of unrefined fluid and the minimum unrefined sample size and outputs the difference to comparator 336. Comparator 336 compares the difference from subtractor 335 with the value zero. If the difference is greater than zero, a signal from comparator 336 is input to AND gate 337.

The signal from comparator 336 and a signal from sequence controller 200 enable AND gate 337 if the short-term accumulated net amount of unrefined fluid exceeds the minimum unrefined sample size. A signal from AND gate 337 sets flip flop 432 and is input to AND gates 338 and 339. The signal from AND gate 337 gates data in short-term net unrefined register 285 (FIG. 5C) via AND gate 338 to subtractor 340. The signal from AND gate 337 also gates data in short-term net refined register 296 via AND gate 339 to subtractor 340.

The difference between the short-term accumulated net amount of unrefined fluid and short-term accumulated net amount of refined fluid in subtractor 340 enters divider 341. Data in short-term net unrefined register 285 (FIG. 5C) also enters divider 341. Consequently, divider 341 generates the current loss as a percentage of the short-term accumulated net amount of unrefined fluid. A signal from flip flop 432 then gates a signal from sequence controller 200 via AND gate 433 to reset to zero registers 285 and 296 and to reset flip flop 432.

During the first short-term loss computation cycle, short-term loss cycle flag 342 is not set. A signal from short-term loss cycle flag 342 is input to AND gate 380. The signal from short-term loss cycle flag 342 and a signal from sequence controller 200 enable AND gate 380. A signal from AND gate 380 sets short-term loss cycle flag 342. Also during this initialization of the short-term loss computation cycle, the signal from AND gate 380 gates zero via AND gate 381 and OR gate 378 to reference loss increment register 349, thereby resetting the reference loss increment to zero.

Finally, the signal from AND gate 380 is input to OR gate 274. A signal from OR gate 274 gates the current percentage loss via AND gate 379 and OR gate 375 to reference percentage loss register 347.

During a subsequent cycle, a signal from short-term loss cycle flag 342 is input to AND gate 343. Together with a signal from sequence controller 200, the signal from short-term loss cycle flag 342 gates the number of statistical samples in sample number selector 57 via AND gate 343 to comparator 344. Comparator 344 compares the number of statistical samples with the value one.

If the number in sample number selector 57 is one, a signal from comparator 344 is input to OR gate 274. Consequently, a signal from OR gate 274 gates the current percentage loss via AND gate 379 and OR gate 375 to reference percentage loss register 347. This produces in reference percentage loss register 347 the current percentage loss of unrefined fluid.

If the number in sample number selector 57 exceeds one, a signal from comparator 344 is input to AND gates 345 and 346. The signal from comparator 344 gates the difference in subtractor 273 between (a) data in reference percentage loss register 347 and (b) the current percentage loss via AND gate 345 to divider 348. The signal from comparator 344 also gates the number in sample number selector 57 via AND gate 346 to divider 348. Divider 348 consequently generates the current loss increment.

The monitor next determines whether or not the current loss increment in divider 348 has the same sign as the reference loss increment in register 349. The current loss increment in divider 348 and data in reference loss increment register 349 enter subtractor 350. Subtractor 350 generates the difference between the reference loss increment and the current loss increment. The difference in subtractor 350 is input to register 351 of comparator 352. The reference loss increment is input to register 353 of comparator 352.

Continuing with the sequence of determining whether or not the current and reference loss increments have the same sign, the reference loss increment is also input to multiplier 354 which generates the square of the reference loss increment. The square of the reference loss increment in multiplier 354 enters square rooter 355. The square root in square rooter 355 enters register 356 of comparator 357 where it is compared with the reference loss increment input to register 358 of comparator 357.

If data in register 353 of comparator 352 equals or exceeds data in register 351 of comparator 352, a signal from comparator 352 is input to AND gate 359 and AND gate 360 indicating that the current loss increment is positive or zero. If data in register 353 of comparator 352 is less than data in register 351 of comparator 352, a signal from comparator 352 is input to AND gate 361 and AND gate 362 indicating that the current loss increment is negative.

If data in register 356 of comparator 357 equals data in register 358 of comparator 357, a signal from comparator 357 is input to AND gate 359 and AND gate 362 indicating that the reference loss increment is positive or zero. If data in register 356 of comparator 357 is not equal to data in register 358 of comparator 357, a signal from comparator 357 is input to AND gate 360 and AND gate 361 indicating that the reference loss increment is negative.

A signal from AND gate 359 or AND gate 361 is input via OR gate 363 to AND gate 370 when the signs of the reference loss increment and the current loss increment are the same. A signal from AND gate 360 or AND gate 362 is input via OR gate 364 to OR gate 371 when the signs of the reference loss increment and the current loss increment differ.

The monitor also determines whether or not the magnitude of the current loss increment is greater than the magnitude of the reference loss increment. The magnitude of the reference loss increment in square rooter 355 enters register 365 of comparator 366. The current loss increment enters multiplier 367 which generates the square of the current loss increment. The square of the current loss increment in multiplier 367 enters square rooter 368 which generates the magnitude of the current loss increment. The magnitude of the current loss increment in square rooter 368 enters register 369 of comparator 366.

A signal from comparator 366 is input to AND gate 370 if the magnitude of the current loss increment is less than the magnitude of the reference loss increment. If the magnitude of the reference loss increment is less than the magnitude of the current loss increment, a signal from comparator 366 is input to OR gate 371.

The monitor also determines whether or not the current loss increment is zero. The current loss increment is input to comparator 372 where it is compared with the value zero. If the current loss increment is zero, a signal from comparator 372 is input to OR gate 371. If the current loss increment is not zero, a signal from comparator 372 is input to AND gate 370.

As described above, if the current loss increment and reference loss increment have the same sign, a signal from OR gate 363 is input to AND gate 370. If the magnitude of the current loss increment does not exceed the magnitude of the reference loss increment, a signal from comparator 366 is input to AND gate 370. Also, if the current loss increment is not equal to zero, a signal from comparator 372 is input to AND gate 370. Under these conditions a signal from sequence controller 200 causes AND gate 370 to become enabled. Consequently, a signal from AND gate 370 gates the sum of the reference loss increment and the reference percentage loss in adder 374 via AND gate 373 and OR gate 375 to reference percentage loss register 347.

As described above, if the signs of the current loss increment and the reference loss increment differ, a signal from OR gate 364 is input to OR gate 371. If the magnitude of the current loss increment exceeds the magnitude of the reference loss increment, a signal from comparator 366 is input to OR gate 371. Also, if the current loss increment is equal to zero, a signal from comparator 372 is input to OR gate 371. In any of these cases, a signal from OR gate 371 is input to AND gate 376 and AND gate 377. The signal from OR gate 371 gates the current loss increment via AND gate 376 and OR gate 378 to reference loss increment register 349, thereby updating the reference loss increment. The signal from OR gate 371 in conjunction with a signal from sequence controller 200 subsequently gates the sum of the updated reference loss increment and the reference percentage loss in adder 374 via AND gate 377 and OR gate 375 to reference percentage loss register 347.

At the end of the short-term loss computation cycle, a signal from sequence controller 200 gates the reference percentage loss in register 347 via AND gate 382 to LED display 58. The reference percentage loss is also input to subtractor 383. Subtractor 383 subtracts from the reference percentage loss a strip chart recorder scale factor in trend zero selector 60. A signal from sequence controller 200 gates the difference in subtractor 383 via AND gate 384 to digital-to-analog (D/A) converter 385. D/A converter 385 generates an analog signal for strip chart recorder 59.

Although the series of short-term loss indications described above is used to monitor the refining process, a series of short-term loss indications could also have been generated to monitor the finishing process. Whereas short-term accumulated net amounts of unrefined and refined fluid are used to determine the series of short-term loss indications for the refining process, short-term accumulated net amounts of refined and finished fluid would be used to determine the series of short-term loss indications for the finishing process, and personnel could thus monitor losses due to removal of (a) air entrained or dissolved in the vegetable oil, (b) volatiles in the vegetable oil, and (c) vegetable oil vapor by vacuum dryer 21 (FIG. 1) during the finishing process. In fact, a series of short-term loss indications between any two flow meter stations along a fluid flow system could be generated.

The smoothing technique of the monitor of the present invention has been described above in connection with generating a series of short-term loss indications between any two flow meter stations along a fluid flow system. The smoothing technique, however, also permits adjustment of flow through a flow meter station to a desired flow, particularly in fluid flow systems with fluctuating or surging conditions. The only required modification would be a substitution for one of the short-term accumulated net amounts of fluid used to determine the series of short-term loss indications. In FIG. 1, for example, flow meter 11 could be disconnected from pulse generator 25. Pulse generator 25 could then be driven by a motor at a predetermined rate to simulate a desired flow condition. A series of short-term loss indications between unrefined and refined flow meter stations would reveal surges in operation of the refining process and flow through the refined flow meter station could be adjusted to stabilize operation.

Referring again to FIG. 4C, if the short-term accumulated net amount of unrefined fluid does not exceed the minimum unrefined sample size or after data f...m a short-term loss computation cycle is input to strip chart recorder 59 (FIG. 3), as indicated by machine function 160 or 178, respectively, the monitor at machine function 179 determines whether or not the monitor reset flag is set. If machine function 179 indicates that the monitor reset flag is set, the monitor computes the batch loss based on the batch amounts of unrefined and finished fluid as indicated by machine function 182 (FIG. 4D).

The monitor then enters the batch loss and batch amounts of unrefined, refined, and finished fluid in the printer message file as indicated by machine functions 183 and 184, resets the batch unrefined, refined, and finished registers to zero, and resets first time flag 332 (FIG. 5C) as indicated by machine functions 185 and 186. The monitor also resets the monitor reset flag as indicated by machine function 187.

Referring to FIG. 5D, the operator sets monitor reset flag 386 when he depresses reset printout command switch 71. If monitor reset flag 386 is set, a signal from monitor reset flag 386 is input to AND gate 387. The signal from monitor reset flag 386 and a signal from sequence controller 200 enable AND gate 387. A signal from AND gate 387 is input to ANd gates 389, 390, 391, and 392.

Subtractor 393 generates the difference between the batch amounts of unrefined and finished fluid in registers 441 and 302 (FIG. 5C). The difference in subtractor 393 enters divider 394. The batch amount of unrefined fluid in register 441 (FIG. 5C) also enters divider 394. Divider 394 generates the batch loss as a percentage of batch unrefined fluid. The result is input to AND gate 389.

The signal from AND gate 387 gates the batch loss via AND gate 389 to printer message file 218 (FIG. 5A). Together with the signal from AND gate 387, subsequent signals from sequence controller 200 sequentially enable AND gates 390, 391, and 392. Signals from AND gates 390, 391, and 392 are sequentially input to AND gate 395 and AND gate 396 in FIG. 5D and AND gate 397 in FIG. 5C, respectively.

The signal from AND gate 390 gates the batch amount of unrefined fluid via AND gate 395 to printer message file 218 (FIG. 5A). The signal from AND gate 391 gates the batch amount of finished fluid via AND gate 396 to printer message file 218 (FIG. 5A). The signal from AND 392 gates the batch amount of refined fluid via AND gate 397 to printer message file 218 (FIG. 5A).

A signal from sequence controller 200 and the signal from AND gate 387 enable AND gate 398. The signal from AND gate 398 resets to zero the batch unrefined, refined, and finished registers 441, 442, and 302 in FIG. 5C, respectively. The signal from AND gate 398 also resets the monitor reset flag 389 and the first time flag 332. By resetting the first time flag 332, the monitor assures that the next overall loss computation will be entered into all 'n' locations of FIFO register 334, thereby effectively erasing the previous values so that the values stored reflect the true overall loss existing since monitor reset.

Referring to FIGS. 4C and 4D, if machine function 179 indicates that the monitor reset flag is not set or after the reset sequence described immediately above, the monitor determines whether or not the operator has requested a manual data entry as indicated by machine function 188. If machine function 188 indicates that the manual data entry flag is set, the monitor resets the manual data entry flag and reads the manually entered data as indicated by machine functions 189 and 190, respectively.

Manual entry of data into appropriate registers in FIG. 5 is analogous to manual entry of the time of day by the procedure described above. Thus, manual data entry involves use of display select switch 62, data switches 61, manual data entry registers 75, data entry switch 73, and data input key 76. In view of the fact that the logic circuitry connected to the various elements duplicates logic circuitry considered in the description of entry of the time of day, further description of manual data entry at this point is omitted.

Returning to FIG. 4D, if machine function 188 indicates that the manual data entry flag is not set, the monitor proceeds to the printout sequence which will be described below.

At machine function 227, the monitor determines whether or not any data has accumulated in the printer message file. If machine function 227 indicates that no data is present in the printer message file, the monitor proceeds to machine function 109 (FIG. 4A) and initiates another monitoring cycle. If machine function 227 indicates that data is present in the printer message file, the moniter prints the data as indicated by machine function 228. After data is printed, the monitor proceeds to step 109 (FIG. 4A) where another monitoring cycle is commenced. As shown in FIG. 5A, if any data is present in printer message file 218, a signal from sequence controller 200 gates the data via AND gate 431 to printer 65.

Although the monitor of the present invention has been described in connection with arithmetic and logic circuitry in the schematic diagram of FIG. 5, a general purpose digital computer may be programmed to carry out the steps of the operational flow diagram of FIG. 4. The use of a general purpose digital computer in lieu of the hard-wired logic and arithmetic circuitry of FIG. 5 would add flexibility to the monitor. For example, with the addition of a flow meter and temperature transducer for water introduced into the refining process and the addition of a flow meter, a temperature transducer, and moisture content transducer for lye introduced into the refining process, the general purpose digital computer could be easily programmed to calculate information such as the unrefined fluid to water ratio and the unrefined fluid to lye ratio. Such information would further aid the operator in adjusting the addition of materials to produce a more efficient refining process.

The monitor of the present invention has been described in connection with hydraulic systems, such as a vegetable oil refinery and a fuel pipeline. The monitor of the present invention, however, also may advantageously be employed in other analogous applications, such as a monitor for electrical power systems, etc. The only modification which may be necessary is the substitution of transducers, such as ammeters for flow meters, to measure the data which is needed for computations.

Having described the invention, we claim:

1. Apparatus for monitoring losses in a fluid flow system, such as a refinery or pipeline, comprising:

at least two measurement stations located at separate positions along a fluid flow path, each said measurement station having means for measuring data related to fluid flowing through said fluid flow path at said separate positions during a series of intervals of operation of said fluid flow system, said data including a gross amount of fluid which has flowed past each said measurement station during each interval of said series of intervals of operation, memory means for storing information related to accuracy of operation of said data measuring means and information related to physical properties of said fluid, sample number selector means for entering a preselected non-zero number, net fluid calculation means responsive to said data and information for calculating a net amount of fluid, net fluid amount accumulator means for accumulating a net amount of fluid which has flowed past each of said at least two measurement stations during each interval of said series of intervals of operation, current loss calculation means for subtracting said accumulated net amount of fluid for one of said at least two measurement stations from said accumulated net amount of fluid for the other of said at least two measurement stations to signify a current loss when said accumulated net amount of fluid for said other measurement station exceeds a predetermined minimum sample amount, reset means for resetting said net fluid amount accumulator means to zero after calculation of said current loss, first means for entering said current loss as a reference loss during a first interval of operation, said reference loss signifying a loss indication for said first interval of operation, increment calculation means responsive to said preselected number for dividing said current loss by said preselected number to signify an increment during subsequent intervals of operation, loss indication calculation means for adding said increment to said reference loss during said subsequent intervals of operation to signify a loss indication for each of said subsequent intervals of operation, and means for displaying said loss indications, whereby a surge in the operation of said fluid flow system which occurs during any of said subsequent intervals of operation is distributed over a number of intervals of operation equal to said preselected number so as to smooth each said surge over a series of loss indications.

2. Apparatus for monitoring deviation in the amount of fluid flow in a fluid flow system, such as a refinery or pipeline, which is susceptible to surges in the amount of fluid flow, comprising:

at least one measurement station located along a fluid flow path having means for measuring data related to fluid flowing through said fluid flow path during a series of intervals of operation of said fluid flow system, said data including a gross amount of said fluid which has flowed past said at least one measurement station during each interval of said series of intervals of operation, signal generating means for generating signals at a preselected rate, the number of said signals during a period of time corresponding to a predetermined amount of fluid, memory means for storing information related to accuracy of operation of said data measuring means and information related to physical properties of said fluid, sample number selector means for entering a preselected non-zero number, net fluid calculation means responsive to said data and information for calculating a net amount of fluid, net fluid amount accumulator means for accumulating a net amount of fluid which has flowed past said at least one measurement station during each interval of said series of intervals of operation, current difference calculation means responsive to said signals for subtracting said accumulated net amount of fluid for said at least one measurement station from said predetermined amount of fluid corresponding to said number of signals to signify a current difference when said accumulated net amount of fluid for said at least one measurement station exceeds a predetermined minimum sample amount, reset means for resetting said net fluid amount accumulator means to zero after calculation of said current difference, first means for entering said current difference as a reference difference during a first interval of operation, said reference difference signifying an indication of deviation of said accumulated net amount of fluid from said amount of fluid corresponding to said number of signals during a first interval of operation, increment calculation means responsive to said preselected number for dividing said current difference by said preselected number to signify an increment during subsequent intervals of operation, deviation calculation means for adding said increment to said reference difference during said subsequent intervals of operation to signify an indication of deviation of said accumulated net amount of fluid from said predetermined amount of fluid during each of said subsequent intervals of operation, and means for displaying said indications of deviation, whereby a surge in the operation of said fluid flow system which occurs during any of said subsequent intervals of operation is distributed over a number of intervals of operation equal to said preselected number so as to smooth each said surge over a series of indications of deviation.

3. A method for monitoring losses in a fluid flow system, such as a refinery or pipeline, including the steps of:

measuring data related to fluid flowing through a fluid flow path at a plurality of measurement stations located at separate positions along the fluid flow path during a series of intervals of operation of the fluid flow system, the data including a gross amount of fluid which has flowed past each measurement station during each interval of the series of intervals of operation, storing information related to accuracy of operation of the measurement stations and information related to physical properties of the fluid, entering a preselected non-zero number by means of a sample number selector, calculating a net amount of fluid which has flowed past at least two measurement stations during each interval of the series of intervals of operation based on the data and information, accumulating a net amount of fluid which has flowed past the at least two measurement stations during each interval of the series of intervals of operation, subtracting the accumulated net amount of fluid for a first of the two measurement stations from the accumulated net amount of fluid for a second of the two measurement stations to signify a current loss when the accumulated net amount of fluid for the second measurement station exceeds a predetermined minimum sample amount, resetting the accumulated net amounts of fluid for the at least two measurement stations to zero after calculation of the current loss, entering the current loss as a reference loss during a first interval of operation, the reference loss signifying a loss indication for the first interval of operation, dividing the current loss by the preselected number to signify an increment during subsequent intervals of operation, adding the increment to the reference loss during the subsequent intervals of operation to signify a loss indication for each of the subsequent intervals of operation, and displaying the loss indications, thereby distributing a surge in the operation of the fluid flow system which occurs during any of the subsequent intervals of operation over a number of intervals of operation equal to the preselected number so as to smooth each surge over a series of loss indications.

4. A method for monitoring deviation in the amount of fluid flow in a fluid flow system, such as a refinery or pipeline, which is suceptible to surges in the amount of fluid flow, including the steps of:

measuring data related to fluid flowing through a fluid flow path at a measurement station located along the fluid flow path during a series of intervals of operation of the fluid flow system, the data including a gross amount of fluid which has flowed past the measurement station during each interval of the series of intervals of operation, generating signals at a preselected rate, the number of the signals during a period of time corresponding to a predetermined amount of fluid, storing information related to accuracy of operation of the measurement station and information related to physical properties of the fluid, entering a preselected non-zero number by means of a sample number selector, calculating a net amount of fluid which has flowed past the measurement station during each interval of the series of intervals of operation, accumulating a net amount of fluid which has flowed past the measurement station during each interval of the series of intervals of operation, subtracting the accumulated net amount of fluid for the measurement station from the predetermined amount of fluid corresponding to the number of signals to signify a current difference when the accumulated net amount of fluid for the measurement station exceeds a predetermined minimum sample amount, resetting the accumulated net amount of fluid for the measurement station to zero after calculation of the current difference, entering the current difference as a reference difference during a first interval of operation, the reference difference signifying an indication of deviation of the accumulated net amount of fluid from the amount of fluid corresponding to the number of signals during a first interval of operation, dividing the current difference by the preselected number to signify an increment during subsequent intervals of operation, adding the increment to the reference difference during the subsequent intervals of operation to signify a subsequent indication of deviation of the accumulated net amount of fluid from the predetermined amount of fluid during each of the subsequent intervals of operation, and displaying the indications of deviation, thereby distributing a surge in the operation of the fluid flow system which occurs during any of the subsequent intervals of operation over a number of intervals of operation equal to the preselected number so as to smooth each surge over a series of indications of deviation.

5. Apparatus for monitoring losses in a fluid flow system, such as a refinery or pipeline, comprising:

at least two measurement stations, including an input measurement station and an output measurement station, located at separate positions along a fluid flow path, each said measurement station having means for measuring data related to fluid flowing through said fluid flow path at said separate positions during a series of intervals of operation of said fluid flow system, said data including a gross amount of fluid which has flowed past each said measurement station during each interval of said series of intervals of operation, memory means for storing information related to accuracy of operation of said data measuring means and information related to physical properties of said fluid, detector means for producing a signal when a coincident processing condition is present, resettable clock means for measuring a time related to a period of operation of said fluid flow system, time delay means for entering a preselected time delay, net fluid calculation means responsive to said data and information for calculating a net amount of fluid which has flowed past each of said input and output measurement stations during each interval of said series of intervals of operation, totalizing means for adding said net amounts of fluid for each of said input and output measurement stations to signify a total net amount of fluid which has flowed past each of said input and output measurement stations during said series of intervals of operation, decision means responsive to said time and said time delay for determining when said time exceeds said time delay, overall loss calculation means under control of said decision means when said time exceeds said time delay for subtracting said total net amount of fluid for said output measurement station from said total net amount of fluid for said input measurement station when said signal is present to signify an overall loss, first means having a reset state when said overall loss relates to a first period of operation and a set state when said overall loss relates to subsequent periods of operation, FIFO register means having $n$' storage locations including a first-in location and a last-in location for entering said overall loss in all said '$n$' storage locations when said first means is in said reset state, said FIFO register means for entering said overall loss into said last-in location, whereby said overall loss in said first-in location is shifted out, when said first means is in said set state, summing means for adding said '$n$' overall losses in said FIFO register means to signify a sum, overall loss indication means for dividing said sum by '$n$' to provide an overall loss indication, and reset means for resetting said totalizing means and clock means to zero after calculation of said overall loss indication, whereby said detector means initiates calculation of said overall loss between said input and output measurement stations after a period of time longer than said time delay.

6. A method for monitoring losses in a fluid flow system, such as a refinery or pipeline, including the steps of:

measuring data related to fluid flowing through a fluid flow path at a plurality of measurement stations, including an input measurement station and an output measurement station, located at separate positions along the fluid flow path during a series of intervals of operation of the fluid flow system, the data including a gross amount of fluid which has flowed past each measurement station during each interval of the series of intervals of operation, storing information related to accuracy of operation of the measurement stations and information related to physical properties of the fluid, producing a signal when a coincident processing condition is present, measuring a time related to a period of operation of the fluid flow system by means of a resettable clock, entering a preselected time delay, calculating a net amount of fluid which has flowed past each of the input and output measurement stations during each interval of the series of intervals operation based on the data and information, adding the net amounts of fluid for each of the input and output measurement stations to signify a total net amount of fluid which has flowed past each of said input and output measurement stations during said series of intervals of operation, determining when the time exceeds the time delay, subtracting the total net amount of fluid for the output measurement station from the total net amount of fluid for the input measurement station when the time exceeds the time delay and the signal is present to signify an overall loss, entering the overall loss in all 'n' storage locations of a FIFO register when the overall loss relates to a first period of operation, entering the overall loss in a last-in location, thereby shifting out the overall loss in a first-in location, when the overall loss relates to subsequent periods of operation, adding the 'n' overall losses in the FIFO register to signify a sum, dividing the sum by 'n' to provide an overall loss indication, and resetting the total net amounts of fluid and the clock to zero after calculation of the overall loss indication, thereby initiating calculation of the overall loss between the input and output measurement stations after a period of time longer than the time delay.

* * * * *